US011239672B2

(12) United States Patent
Bourilkov et al.

(10) Patent No.: US 11,239,672 B2
(45) Date of Patent: Feb. 1, 2022

(54) MONITORING CHARGING EFFICIENCY OF A MOBILE COMPUTING DEVICE VIA A POWER BANK

(71) Applicant: DURACELL U.S. OPERATIONS, INC., Wilmington, DE (US)

(72) Inventors: Jordan Bourilkov, Bethany, CT (US); John Rotondo, Trumbull, CT (US); Francisco Jose Restrepo, Fairfield, CT (US); Sergio Coronado Hortal, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 116 days.

(21) Appl. No.: 16/827,384

(22) Filed: Mar. 23, 2020

(65) Prior Publication Data

US 2021/0296914 A1    Sep. 23, 2021

(51) Int. Cl.
*H01M 10/46* (2006.01)
*H02J 7/00* (2006.01)
*H02J 50/20* (2016.01)

(52) U.S. Cl.
CPC ........ *H02J 7/0044* (2013.01); *H02J 7/00034* (2020.01); *H02J 7/0071* (2020.01); *H02J 50/20* (2016.02)

(58) Field of Classification Search
CPC .... H02J 7/0044; H02J 7/00034; H02J 7/0071; H02J 7/00714; H02J 7/0048; H02J 7/0049
USPC ....... 320/107, 114, 115, 132, 134, 135, 149, 320/162; 340/636.1, 636.12, 636.13, 340/636.15, 636.19, 636.2; 702/63–65
See application file for complete search history.

(56) References Cited

U.S. PATENT DOCUMENTS

| 6,946,817 | B2 | 9/2005 | Fischer et al. |
| 7,471,059 | B2 | 12/2008 | Bayne et al. |
| 7,701,173 | B2 | 4/2010 | Veselic |
| 7,791,319 | B2 | 9/2010 | Veselic et al. |

(Continued)

FOREIGN PATENT DOCUMENTS

| CN | 104065146 A | 9/2014 |
| CN | 104810900 A | 7/2015 |
| GB | 2401258 B | 6/2005 |

OTHER PUBLICATIONS

Internal Photos, OET Exhibits List, Federal Communications Commission, Office of Engineering and Technology, retrieved from the Internet at: <<https://apps.fcc.gov/oetcf/eas/reports/ViewExhibitReport.cfm?mode=Exhibits&RequestTimeout=500&calledFromFrame=N&application_id=ZzvHwbtga3TbmxipGAQt%2BA%3D%3D&fcc_id=2ALO6-ORBITPB>> made available only on Nov. 9, 2017.

(Continued)

*Primary Examiner* — Edward Tso
(74) *Attorney, Agent, or Firm* — Marshall, Gerstein & Borun LLP

(57) ABSTRACT

A portable power bank for charging a mobile computing device is described, and a dynamic charging efficiency is monitored while the power bank is charging the mobile computing device. Particularly, instantaneous power output of a battery of the power bank is compared to power received by a battery of the mobile computing device to determine efficiency. The charging of the mobile computing device by the power bank is interrupted and/or resumed based upon the charging efficiency at any given time, thereby preventing inefficient use of the power bank.

20 Claims, 11 Drawing Sheets

(56) References Cited

U.S. PATENT DOCUMENTS

| | | |
|---|---|---|
| 9,444,274 B2 | 9/2016 | Tu |
| 9,647,474 B2 | 5/2017 | Fathollahi et al. |
| 9,726,763 B2 | 8/2017 | Dempsey et al. |
| 9,983,312 B2 | 5/2018 | Dempsey et al. |
| 10,416,309 B2 | 9/2019 | Dempsey et al. |
| 2020/0014252 A1* | 1/2020 | Wan .................... H02J 7/00714 |

OTHER PUBLICATIONS

Orbit 5000mAh Portable Charger Powerbank with Bluetooth Tracker—Black, HButler, retrieved from the Internet at: <<https://www.amazon.com/dp/B0719MFHRD/ref=as_li_ss_tl?tag=mode065-20&_encoding=UTF8&psc=1&linkId=398a91042563750e414c24c69ab645ff&language=en_US>> made available May 17, 2017.

CoalBit Doubles as Power Bank and Bluetooth Tracker, retrieved from the Internet at: https://www.digitaltrends.com/mobile/coalbit-power-bank-kickstarter/ made available only on Mar. 23, 2016.

Goplug smart power bank (110v) gppb0110v b&h photo video, retrieved from the internet at: https://www.bhphotovideo.com/c/product/1348369-reg/goplug_gppb0110v_110v_smart_power_bank.html/overview believed to be publically available by 2000-2020.

Instruction Manual Orbit, retrieved from the Internet at: <https://findorbit.zendesk.com/hc/en-us/articles/115001300973-Orbit-User-Guide-English-> made available Jan. 2020.

\* cited by examiner

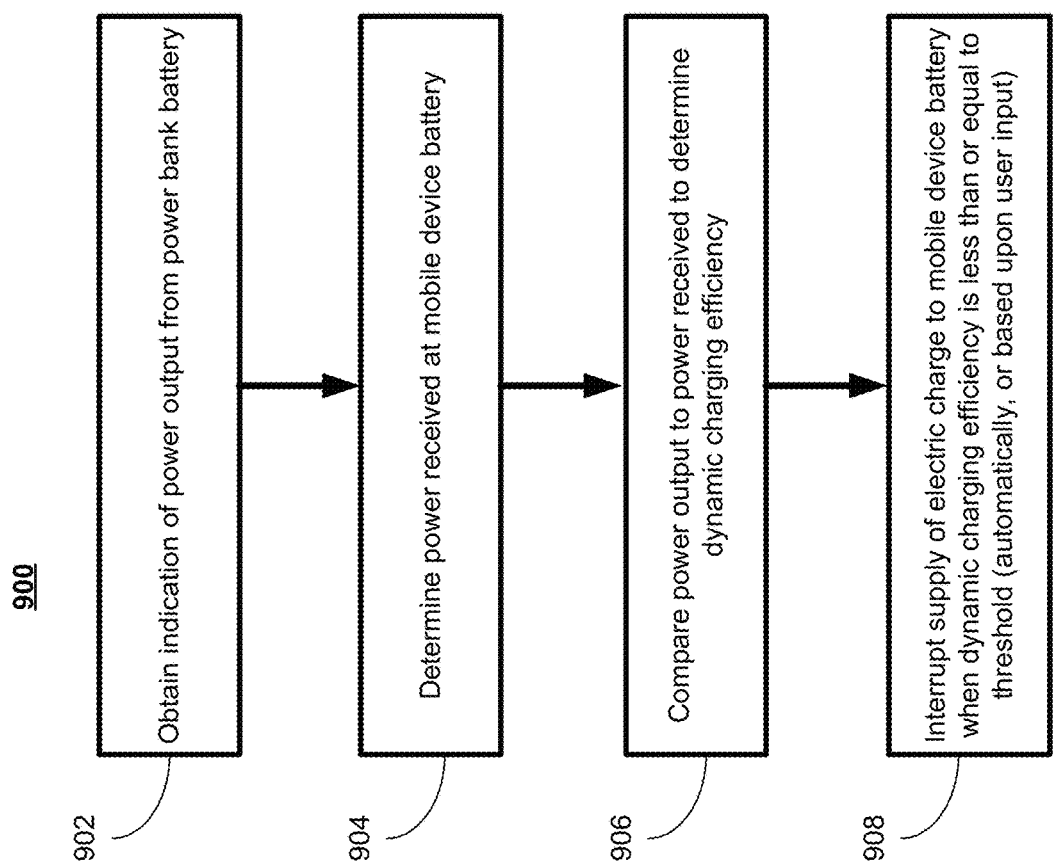

MONITORING CHARGING EFFICIENCY OF A MOBILE COMPUTING DEVICE VIA A POWER BANK

FIELD OF THE INVENTION

The disclosure generally relates to apparatus and methods to determine instantaneous charging efficiency during a charging of a mobile computing device by a power bank and, more particularly, to interrupt the charging in response to low charging efficiency.

BACKGROUND

A power bank is a portable electronic device, chiefly including a rechargeable battery that is electrically connectable to one or more mobile computing devices. The power bank uses the electrical connection to supply electric charge to respective batteries of the mobile computing device(s). A user of a smartphone, for example, may carry a power bank so that, when the battery charge level of the smartphone is low, the user can connect the smartphone to the power bank (e.g., by USB or wireless charging means). Upon the power bank partially or fully recharging the smartphone battery, the user can continue to use the smartphone with less concern for depleting their smartphone battery.

Capacity of a power bank battery is typically expressed either in units of electric charge (e.g., milliampere-hours (mAh)) or units of energy (e.g., watt-hours (Wh)). As an example, a power bank may have a stated capacity of 12000 mAh, and the power bank may be used to charge a smartphone having a battery capacity of 3000 mAh. Applying simple math to the capacities, the user of the smartphone might assume that the power bank, starting from full capacity, can provide four full chargings to the smartphone (or perhaps, eight half-chargings) before the power bank is depleted and must be recharged.

However, it is understood that a power bank battery loses at least some of its capacity over time. Thus, the actual capacity of the example power bank battery may be substantially below the stated capacity of 12000 mAh (e.g., lower than 11000 mAh, 10000 mAh, and/or 9000 mAh, etc.). Furthermore, transfer of charge from the power bank battery to the mobile computing device battery is not 100% efficient. That is, at least some energy losses (or "efficiency losses") are certain to occur between the power bank battery and the mobile computing device battery during charging. Efficiency losses are caused by a number of factors, which are not always constant over time, and which often are not even constant during a same charging session between the power bank and mobile computing device.

Simply put, as a result of efficiency losses during charging of a mobile computing device via a power bank, more charge is spent by the power bank battery than is obtained by the mobile computing device battery. Thus, the power bank on a full charge may have substantially less "real" charging capability than would be assumed by the user thereof. A power bank user may be frustrated when their power bank runs out of battery charge after providing substantially less charge to the mobile computing device battery than the user expects.

SUMMARY

One embodiment includes a portable power bank device ("power bank"). The power bank includes a battery ("power bank battery") for supplying electric charge to a battery of a mobile computing device external to the power bank. Particularly, the power bank battery supplies the electric charge via an electrical connection between the power bank battery and the battery of the mobile computing device ("mobile computing device battery"). The power bank further includes a communication module for exchanging communication signals with the mobile computing device. The power bank still further includes a control module comprising one or more processors and a memory. The memory stores non-transitory instructions that, when executed via the one or more processors, cause the power bank to (1) while the power bank is supplying electric charge to the mobile computing device, determine an instantaneous power output of the power bank battery, (2) obtain, via the communication module, a communication signal from the mobile computing device, the obtained signal being indicative of an amount of power received at the mobile computing device battery, (3) compare the amount of power received at the mobile computing device battery to the instantaneous power output of the power bank battery to determine a dynamic charging efficiency, and (4) interrupt the supply of electric charge to the mobile computing device battery when the dynamic charging efficiency is less than or equal to a threshold value.

Another embodiment includes a mobile computing device. The mobile computing device includes an internal battery configured to act as a power supply for the mobile computing device. The internal battery of the mobile computing device is also configured to receive electric charge from battery of a portable power bank device external to the mobile computing device. Particularly, the mobile computing device battery receives the electric charge via an electrical connection between the power bank battery and the mobile computing device battery. The mobile computing device further includes a communication module for exchanging communication signals with the power bank. The mobile computing device still further includes one or more processors and one or more computer-readable memories storing non-transitory computer executable instructions. The instructions, when executed via the one or more processors, cause the mobile computing device to (1) while the mobile computing device battery is receiving electric charge from the power bank, obtain, via the communication module, a communication signal from the power bank, the obtained signal being indicative of an instantaneous power output of the power bank battery, (2) determine an amount of power received at the mobile computing device battery from the power bank battery, (3) compare, via the one or more processors, the amount of power received at the mobile computing device battery to the instantaneous power output of the power bank battery to determine a dynamic charging efficiency, and (4) interrupt the supply of electric charge to the mobile computing device battery when the dynamic charging efficiency is less than or equal to a threshold value.

In accordance with the teachings of the disclosure, any one or more of the foregoing aspects of an apparatus or a method may further include any one or more of the following optional forms.

In an optional form, an indication of the dynamic charging efficiency is displayed at the mobile computing device. A graphical user interface may, for example, provide a user of the mobile computing device an option of whether to cause the supply of charge to be interrupted and/or resumed. The interrupting of the supply of the electric charge may be based in part upon a user interaction with the graphical user interface, or may be triggered automatically based upon one or more pre-determined conditions (e.g., an efficiency threshold). If the supply of charge has already been interrupted, the graphical user interface may provide an option to cause the supply of charge to resume.

In another optional form, the supply of electric charge resumes at some point subsequent to the interrupting of the supply of electric charge. For example, the supply of charge may resume after the mobile computing device battery charge level decreases and charging efficiency increases back above the threshold value.

In still other optional forms, various techniques are used to calculate the instantaneous power output of the power bank battery and/or the power received by the mobile computing device battery. Particularly, various techniques are used to determine a voltage value, current value, and/or power value for the power bank battery and/or for the mobile computing device battery. Additionally, various techniques are used to communicate determined values to the power bank and/or to the mobile computing device.

In yet other optional forms, various combinations of communication and charging means are used by the mobile computing device and power bank. Communication means may include wired and/or wireless communication means (e.g., USB data communications, wireless radio frequency (RF) communications, etc.). Charging means may include various wired and/or wireless structure for electrically connecting the power bank to the mobile computing device (e.g., USB charging, Lightning charging, wireless charging means using the Qi standard, etc.).

Embodiments may further include methods including operations of the apparatus described herein, and/or non-transitory computer readable media comprising computer-executable instructions that cause a processor to perform a method via apparatus described herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. Each figure depicts a particular aspect of the disclosed system and methods, and each of the figures is intended to accord with a possible aspect thereof. Further, wherever possible, the following description refers to the reference numerals included in the following figures, in which features depicted in multiple figures are designated with consistent reference numerals.

There are shown in the Figures arrangements which are presently discussed, it being understood, however, that the present embodiments are not limited to the precise arrangements and instrumentalities shown, wherein:

FIG. 9 illustrates an example method associated with a mobile computing device, in accordance with one aspect of the present disclosure.

Figure 1:
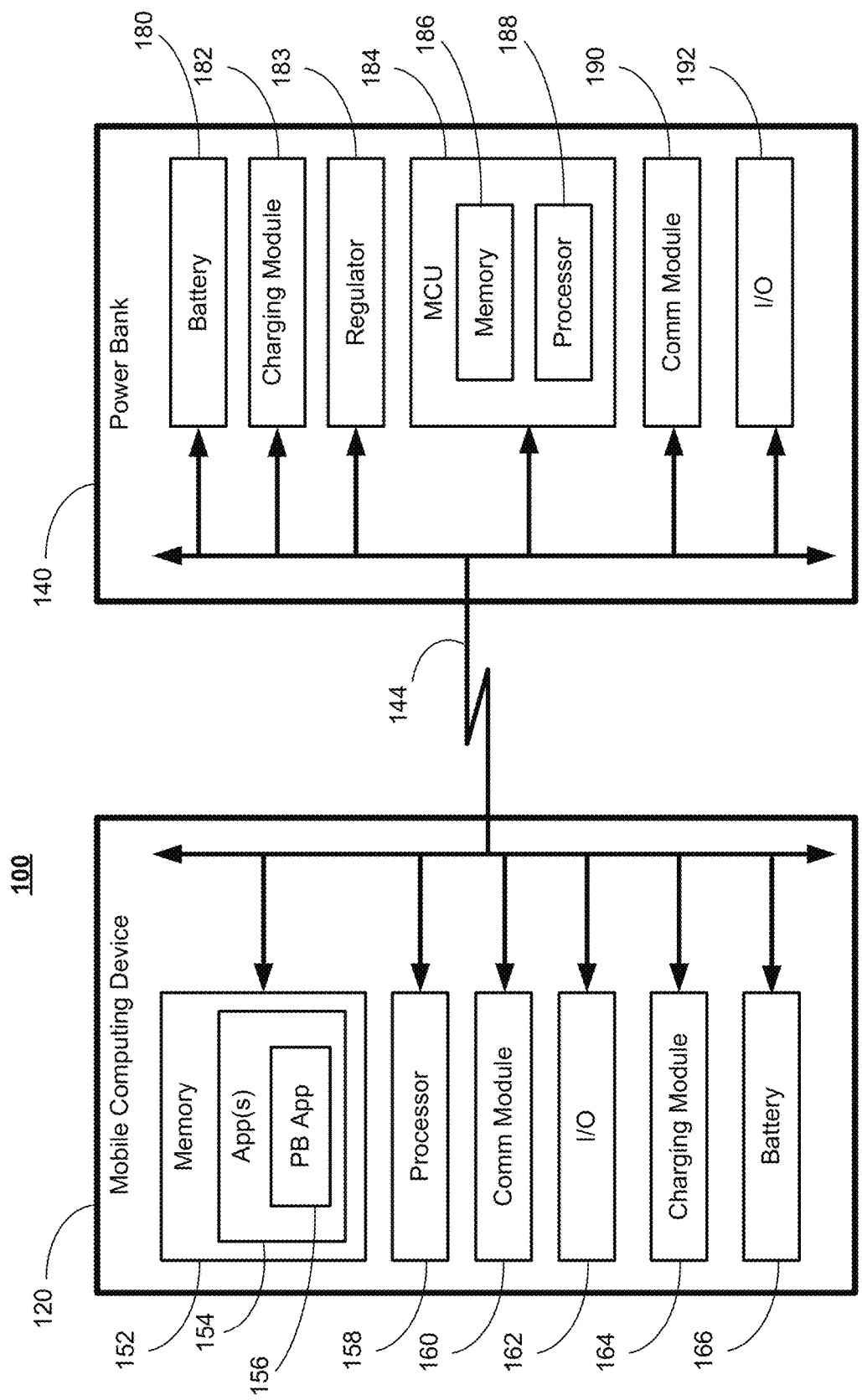
FIG. 1 illustrates an example computing environment including a power bank and a mobile computing device, in accordance with one aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Embodiments of the present disclosure include a portable power bank device ("power bank") and a mobile computing device (e.g., a smartphone). Each of the power bank and the mobile computing device include a respective internal battery ("power bank battery" and "mobile computing device battery," respectively). The power bank is configured to use its battery to supply electric charge to the mobile computing device battery, by way of an electrical connection between the power bank and the mobile computing device. The electrical connection may include, for example, a USB-C connection, micro USB connection, Lightning charging connection, a Qi-standard wireless connection, etc., and/or another wired or wireless structure for electrically connecting the mobile computing device to the power bank.

Embodiments of the present disclosure include determining a dynamic charging efficiency while the power bank battery is supplying charge to the mobile computing device battery ("charging the mobile computing device"). Particularly, embodiments of the present disclosure include (1) determining an instantaneous power output from the power bank battery, and (2) determining an instantaneous amount of power received by the mobile computing device battery ("power input"). The instantaneous power output and power input are compared to determine a dynamic charging efficiency between the power bank battery and mobile computing device battery. In embodiments described herein, dynamic charging efficiency is monitored over the course of a charging session between the power bank and mobile computing device (e.g., repeatedly calculated by the power bank and/or by the mobile computing device).

In various embodiments of the present disclosure, calculations are performed by the power bank and/or by the mobile computing device to determine instantaneous power output, instantaneous power input, and dynamic charging efficiency. Furthermore, in various embodiments of the present disclosure, various techniques are utilized to calculate the power output of the power bank battery and/or the power received by the mobile computing device battery. More particularly, various techniques may be applied to perform measurements of voltage and/or current of the power bank battery and of the mobile computing device battery, and the voltage and/or current values are used to determine power output and/or power input.

In any case, when the dynamic charging efficiency is equal to or less than a threshold value (e.g., 80%, 70%, 60%, 50%, etc.), actions are taken to prevent inefficient charging that might otherwise waste battery charge of the power bank. In some embodiments, these actions include interrupting the supply of electric charge from the power bank battery to the mobile computing device battery, automatically based on one or more predetermined conditions, or in response to user input after notifying a user of the dynamic charging efficiency (e.g., via a push notification). Notifying the user may allow the user to interact with the mobile computing device to cause interruption of the supply of charge, for example, even if the power bank and mobile computing device may remain electrically connected, e.g., by a USB charging cable or via a wireless charging connection. In some embodiments, where wired charging is used (e.g., USB charging cable), the user alternatively can physically disconnect the power bank from the mobile computing device when the user is notified of the charging efficiency (e.g., by removing the USB charging cable from a charging port of either of the power bank or mobile computing device), thereby interrupting the supply of charge from the power bank battery to the mobile computing device battery. Similarly, in some embodiments, where wireless charging is used (e.g., Qi-standard wireless charging), the user alternatively can physically remove the mobile computing device from a wireless charging pad when the user is notified of the dynamic charging efficiency, thereby interrupting the supply of charge from the power bank battery to the mobile computing device battery. Furthermore, in some embodiments, a push notification or full-screen application display is provided to the mobile computing device to notify the user of low charging efficiency, and the user can interact with the push notification or full-screen application to cause interruption of the supply of charge, even without disconnecting the electrical connection or removing the mobile computing device from the wireless charging pad.

Use of the methods and power banks described herein facilitate more efficient use of a power bank. Users of power banks typically do not know when the most severe efficiency losses are occurring, and thus users may use power banks in a manner that undesirably wastes battery charge. A supply of charge from a power bank to a mobile computing device is typically interrupted only when the mobile computing device is done charging (i.e., when the mobile computing device battery reaches a 100% charge level and cannot accept more charge). By contrast, use of the methods and power banks described herein advantageously allows for interruption of charging based upon the dynamic charging efficiency, even when the mobile computing device battery has not reached 100% charge. The methods and power banks described herein allow for charging of a mobile computing device by the power bank when the charging is more efficient (e.g., at least 70% for USB charging, or at least 50% for wireless charging), while facilitating user action to prevent charging and/or automatically interrupting the supply of charge when the charging is substantially inefficient (e.g., 50% or less for USB charging, or 30% or less for wireless charging). By facilitating more efficient utilization of the power bank's stored charge, the methods and power banks disclosed herein allow for a single full charge of the power bank (or partial charge of the power bank) to effectively provide more charge to more mobile computing devices before requiring recharging of the power bank itself.

Before further description, definitions of certain terms are provided, these terms being used throughout this detailed description.

As used herein, the term "power bank" refers to a portable electronic device usable for supplying electric charge to one or more mobile computing devices (e.g., a smartphone, a tablet, and/or a portable media player). The power bank chiefly comprises a rechargeable battery ("power bank battery"), such as a rechargeable lithium-ion or lithium-polymer battery. More particularly, the power bank battery includes one or more cells (e.g., electrochemical cells), which may be arranged in series, in parallel, or in an alternative aspect, include cells arranged in series and in parallel. The power bank may charge the mobile computing device (i.e., supply electric charge to the mobile computing device battery) via wired means for electrically connecting the power bank to the mobile computing device (e.g., USB or Lightning cable connection) and/or via wireless means for the same (e.g., Qi-standard wireless charging means). Means for electrically connecting the power bank to the mobile computing device are collectively referred to herein as an "electrical connection" between the power bank battery and the mobile computing device battery.

Capacity of a battery (e.g., of a rechargeable power bank battery) generally refers to a maximum electric charge or energy that can be held by the battery. Measured capacity of a battery may be expressed in units of electric charge (e.g., ampere-seconds, coulombs (C), milliampere-hours (mAh), and/or other suitable units) or in units of energy (e.g., watt-hours (Wh), joules (J), and/or other suitable units). "Nominal capacity" refers to an initial stated capacity of the battery (e.g., as stated by a manufacturer or retailer and corresponding to optimal capacity at the time of manufacture). "Actual capacity" refers to the battery's "real" or "true" capacity at a given time, and it will be understood that actual capacity will typically become less than nominal capacity and thus vary especially over a period of time. Actual capacity is typically measured in the same units as nominal capacity (e.g., when the battery's nominal capacity is rated in units of electric charge, the actual capacity is measured in the same). Actual capacity may be used in combination with a specific time to communicate the charge or energy held by the battery at that specific time, and thus two actual capacities determined at different times may be used to communicate the variance of charge or energy held by the battery over a time interval. "Present actual capacity" (or simply "present capacity") refers to the actual capacity of the battery at a present (current) time. "State of health" of the battery, as used herein, is a comparison of an actual capacity of the battery to a nominal capacity of the battery (e.g., actual capacity divided by nominal capacity, expressed as a ratio or percentage). Where techniques are described herein in relation to batteries having capacities expressed in units of electric charge, it should be understood that similar techniques may be applied in relation to batteries having capacities expressed in units of energy, given appropriate modifications (which will be described herein).

"Fuel gauge," also referred to herein as "charge level," refers to the measured/determined amount of charge or energy held by a battery (e.g., rechargeable power bank battery, rechargeable smartphone battery, etc.) at a given time. Charge level may be expressed as a percentage, i.e., the percentage representation of the amount of charge held by the battery in comparison to a capacity of the battery. Mobile computing devices such as smartphones typically display their charge level in percentage form (e.g., 51%) for viewing by the user of the mobile computing device. It should be noted that, typically, a charge level of a battery is relative to the battery's present capacity, not the battery's nominal capacity. For example, if the present capacity of a given device battery is 8000 mAh compared to a nominal capacity of 10000 mAh, and the device indicates a present charge level of "100%," this means that the battery holds a charge of 8000 mAh (not 10000 mAh).

A "charging" or "recharging" of a given device, as used herein, is a supplying of electric charge to a rechargeable battery of the device, thereby increasing the charge level of the device. A charging may, for example, increase the device charge level from 0% to 100%, from 0% to 40%, from 51% to 63%, from 55% to 100%, etc. The act of charging over time is referred to herein as a "charging session." Conversely, a "depletion" of a given device (e.g., of the power bank) is a spending of electric charge by the device which thereby decreases the charge level of the device. Depletion of the device may, for example, reduce the device charge level from 100% to 0%, from 100% to 65%, from 80% to 20%, from 33% to 0%, etc.

The term "instantaneous," as used herein, refers to a value of a variable at a given time (e.g., at the time of measurement or calculation of the variable). For example, "instantaneous power output" of a power bank battery refers to the amount of power output by the battery at a given time, where the power output can vary over time (e.g., represented in watts (W)). "Instantaneous power input" of a mobile computing device battery (or "power received at the mobile device battery") refers to the amount of power received at the mobile device battery at a given time, where the power input also can vary over time. "Dynamic charging efficiency" refers to an efficiency value of charging from a first device to a second device (e.g., from the power bank battery to the mobile computing device battery), based upon a comparison of instantaneous power output from the first device battery to corresponding instantaneous power input at the second device battery at the same time or about at the same time. Charging efficiency can vary over time, as will be understood from this disclosure.

"Power bank" may be used at points herein to more specifically refer to the power bank battery and thus, given the appropriate context, these terms may be considered interchangeable. For example, where the term "power bank" is described in relation to electricity, capacity, provision of charge, etc., the term should be understood as referring more specifically to the battery of the power bank (e.g., "capacity of the power bank," "receiving charge from the power bank," "charge level of the power bank," etc., specifically referring to the battery of the power bank). Similar terms may be used to describe a mobile computing device charged by the power bank (e.g., smartphone charged by the power bank). For example, terms such as "charging a mobile computing device" or "charge level of a mobile computing device" may refer more specifically to the battery of the mobile computing device.

A power bank according to this disclosure may include a microcontroller (MCU). At a very high level, computing functionalities of the power bank MCU are typically limited to the functionalities that relate to (1) provision of charge from the power bank to a mobile computing devices (e.g., allowing charge to be supplied, interrupting the supply of charge, etc.), and/or (2) calculations pertaining to characteristics of electricity which may be used in furtherance of provision of charge (e.g., measurements or calculations of power, energy, current, voltage, resistance, capacity, and efficiency).

Although a power bank according to this disclosure may have some display capabilities (e.g., a blinking LED light or a power meter metric bar or display graphic indicative of power bank battery's charge level), the power bank according to this disclosure generally does not include a substantial display. For example, size of a power bank display screen may be limited such that the display screen does not have a viewing surface area greater than 25 cm$^2$, and/or greater than 16 cm$^2$. Additionally or alternatively, functionality of the power bank display screen is typically limited to only a simple numerical display (e.g., without the HD screen functionalities that are typically present in smartphones, tablets, notebook computers, etc.). As a result, the primary power draw from the power bank battery according to this disclosure is the charging of the mobile computing device (and not the operation of the limited power bank display itself, which requires substantially less power). Similarly, although a power bank as described herein may include some communication capabilities (e.g., RF communications, such as via Bluetooth Low Energy), wired and/or wireless communication functionalities of a power bank are typically limited to those functionalities which relate at least indirectly to provision of electric charge and/or communication of electrical characteristics to a mobile computing device associated therewith as described herein. In the power bank, these functionalities are performed via communications protocols that can be implemented at low power and low computing demand (e.g., Bluetooth Low Energy or WiFi), rather than more complex protocols that are less suitable for power banks and more suitable for mobile computing devices (e.g., cellular communications).

A power bank is typically limited in physical size, weight, and/or dimensions, such that the power bank can easily be carried by the user of a mobile computing device (e.g., in a pocket, purse, backpack, etc.). Often, the power bank has a physical size and weight comparable to that of a smartphone. However, other physical forms of power banks are possible. For example, some power banks are substantially larger in size and capacity, and thereby more effective for supplying more charge, e.g., capable of charging devices a greater number of times, capable of substantially charging larger devices such as laptop computers (e.g., providing sufficient charge to charge the laptop computer battery from 10% to 30%, 40%, 50%, 60%, or more).

Furthermore, as a result of functionalities of a power bank being limited to the functionalities described above, the power bank generally has limited input/output (I/O) functionalities. For example, the power bank may not include a dedicated keyboard or touchpad. Additionally, although the power bank may include one or more ports (e.g., USB port, micro-USB port, etc., which may facilitate charging and/or data communications), typically, any ports included in the power bank are not adapted to receive a keyboard, mouse, peripheral touchpad, monitor or other peripheral I/O device.

Example Computing Environment

FIG. 1 illustrates an example computing environment 100 illustrating a power bank 140 according to this disclosure in which techniques described herein may be implemented. The environment 100 includes a mobile computing device 120, which may be a smartphone, tablet, wearable computing device, laptop computer, and/or other suitable computing device. The environment 100 further includes the power bank 140, which is generally configured to supply electric charge to one or more mobile computing devices (e.g., to the mobile computing device 120).

In addition to being electrically connected so that electric charge may be supplied from the power bank 140 to the mobile computing device 120, the mobile computing device 120 and power bank 140 may be communicatively connected via one or more communicative connections 144. The one or more communicative connections 144 may include a wireless radio frequency (RF) connection (e.g., via Bluetooth Low Energy (BLE), Zigbee, WiFi low Power, 6LoW-PAN, and/or other suitable protocols). Additionally or alternatively, the one or more communicative connections may be implemented by a wired connection between the power bank 140 and the mobile computing device 120 (e.g., via wired USB or Lightning cable connection). In some embodiments, a single connection between the mobile computing device 120 and power bank 140 (e.g., a USB data/charging wired connection) may both electrically and communicatively connect the power bank 140 to the mobile computing device 120 and thereby facilitate a combination of communication and charging capabilities between the mobile computing device 120 and the power bank 140.

The mobile computing device 120 includes a memory 152 (i.e., one or more memories 152, e.g., RAM, ROM, etc.). The memory 152 includes one or more applications 154 ("App(s)"), each of which comprises one or more sets of non-transitory computer-executable instructions. In particular, the one or more applications 154 includes a power bank application 156 ("PB App"), which may, for example, facilitate measuring, monitoring, and viewing of dynamic charging efficiency and/or purposive interruption of the supply of electric charge to the mobile computing device 120. In some embodiments, the one or more applications 154 use an application programming interface (API) that provides access to electrical characteristics of the mobile computing device 120, which are measured via internal circuitry of the mobile computing device 120 (e.g., voltage, current, resistance, etc.).

The mobile computing device 120 further includes a processor 158 (i.e., one or more processors, e.g., CPU, GPU, etc.), which may execute the non-transitory computer executable instructions included in the memory 152. The mobile computing device additionally includes a communication module 160 ("Comm Module"), which may establish communications and exchange communication signals with the power bank 140 via the one or more communicative connections 144. Communication signals to and/or from the communication module 160 may include wireless signals (RF signals) or wired communication signals (e.g., via USB data connection). The mobile computing device still additionally includes an I/O 162 for connecting one or more input devices and/or one or more output devices (e.g., a dedicated display screen such as a touchscreen).

The processor 158 of the mobile computing device 120 may particularly include an analog to digital converter (ADC) configured to convert analog measurements of voltage, current, resistance, and/or other electrical characteristics at the mobile computing device 120 to digital values. Digital values can be transmitted via the communication module 160 to the power bank 140 via the one or more communicative connections 144 (e.g., via a wireless RF connection).

The mobile computing device 120 includes a charging module 164 (e.g., a USB charger) chiefly configured to receive electric charge and direct the electric charge to a rechargeable battery 166 of the mobile computing device 120 ("mobile computing device battery 166"). The battery 166 is the primary power source of the mobile computing device 120. Usually, the battery 166 is internal to the mobile device 120 (e.g., fixedly or removably placed inside a cavity of the mobile computing device 120).

The charging module 164 may include one or more charging ports (e.g., USB port or Lightning port) and/or additional circuitry for receiving and directing electric charge to the battery 166 when the charging module 164 receives electric charge from an external power supply (i.e., a supply of electric charge). The external power supply may be the power bank 140 according to this disclosure, and/or another external power supply (e.g., a wall outlet, a vehicle charging port, etc.).

Operations of the processor 158 may include operations for managing the supply of electric charge to the battery 166 via the charging module 164 (e.g., operating a switch to interrupt and/or resume the supply of electric charge to the battery 166).

In some embodiments described herein, the charging module 164 is coupled to a voltage regulator (e.g., a DC-to-DC voltage converter). The voltage regulator may be configured, for example, to convert the voltage of a charging port of the mobile computing device 120 to a voltage of the battery 166. For example, in a mobile computing device 120 that is configured to receive power via a 5 volt (5V) USB charging port, the voltage regulator may include a step-down converter ("buck converter") configured to reduce the USB voltage to 3.6V or another suitable voltage corresponding to the battery 166. Similar voltage conversion may be performed based upon (1) the voltage of components of the charging module 164, which may vary based upon the charging means used (e.g., Lighting charging, Qi-standard wireless charging means, etc.), and (2) the voltage of the mobile computing device battery 166. Additional description of components of the charging module 164 will be provided with respect to FIG. 2.

Still referring to FIG. 1, the power bank 140 includes a rechargeable battery 180. The power bank battery 180 is the primary power source of the power bank 140 itself, and is also the power source by which the power bank 140 supplies charge to mobile computing devices. The power bank battery 180 may be, for example, a lithium-ion battery, a lithium-polymer battery, and/or another type of secondary battery. The power bank battery 180 may comprise one or more electrochemical cells, connected in parallel and/or in series.

The power bank 140 includes at least one charging module 182 (e.g., a USB charger), which generally is configured to (1) receive and direct electric charge to the power bank battery 180 (e.g., charge received from an AC wall outlet, vehicle charging port, etc.), and (2) supply electric charge via an electrical connection to one or more mobile computing devices. Two or more charging modules 182, for example, in one specific implementation, three charging modules 182 may be included to allow recharging of the battery while simultaneously permitting charging of two mobile computing devices. In possible embodiments, the electrical connection may be implemented via wired and/or wireless means (e.g., USB charging, Lightning charging, Qi-standard wireless charging means, and/or other suitable means).

The charging module 182 may be coupled to a voltage regulator 183 (e.g., a DC-to-DC voltage converter). The voltage regulator 183 may be configured, for example, to convert a first voltage associated with a power source of the power bank 140 (e.g., a 120V AC wall outlet) to a second voltage of the power bank battery 180 (e.g., 3V, 3.6V, or 4.2V) while the power bank 140 is being recharged. Additionally or alternatively, the voltage regulator 183 may be configured to convert the voltage of the power bank battery 180 to still another voltage of a charging connection to the mobile computing device 120 (e.g., the voltage regulator 183 may include a step-up or "boost" converter configured to convert the power bank voltage to 5V for a USB charging connection) while the power bank 140 is supplying charge to the mobile computing device 120. Voltage conversion within the power bank 140 may vary based upon (1) the voltage of the power bank battery 180, and (2) the voltage associated with the charging means by which charge is provided to the mobile computing device 120 (e.g., Lighting charging, Qi wireless charging, etc.). Additional description of components of the charging module 182 will be provided with respect to FIG. 2.

The power bank 140 includes a microcontroller 184 (MCU, also referred to herein as a control module) comprising a memory 186 and a processor 188. The memory 186 (i.e., one or more memories) may include ROM, RAM, and/or other suitable types of computer memory. The processor 188 (i.e., one or more processors) may include a CPU and/or other suitable processing unit(s), which executes non-transitory instructions stored at the memory 186. In various embodiments, the MCU 184 performs measurements of electrical characteristics via the charging module 182 (e.g., measurements of voltage of the battery 180, outflowing current from the battery 180, and/or other measurements described herein) and performs calculations based upon the values obtained via the performed measurements. Furthermore, the MCU 184 may control operations of the charging module 182 (e.g., operating a switch therein to interrupt and/or resume a supply of electric charge to the power bank battery 180 from an external power source, and/or a supply of charge from the power bank 140 to the mobile computing device battery 166, e.g., based upon dynamic charging efficiency in order to increase energy efficiency of the power bank 140).

The power bank 140 additionally includes a communication module 190 ("Comm Module") configured to exchange wired and/or wireless communication signals with the mobile computing device 120 via the one or more communicative connections 144 (e.g., RF digital communications using Bluetooth Low Energy, WiFi, etc.). The communication module 190 may include a digital radio transceiver. Non-transitory instructions stored at the power bank memory 186 may include instructions that, when executed by the processor 188, cause the communication module 190 to transmit indications of measured electrical characteristics and/or other calculations performed by the MCU 184 (e.g., indications of voltage, current, resistance, instantaneous power output, etc.) to the mobile computing device 120.

The MCU 184 may particularly include an analog to digital converter (ADC) configured to convert analog measurements of voltage and/or other electrical characteristics at the power bank 140 to digital values. Digital values can be transmitted via the communication module 190 to the mobile computing device 120 via the one or more communicative connections 144 (e.g., via a wireless RF connection).

Optionally, the power bank includes an I/O 192 for connecting one or more input devices and/or one or more output devices. In particular, the I/O 192 may include a power button which controls interruption/resumption of a supply of charge from the power bank battery 180 to a battery of a mobile computing device (e.g., to the battery 166 of the mobile computing device 120). In some embodiments, the I/O 192 may include one or more light emitting diodes (LEDs) and/or other graphical output, which may for example be an icon providing an indication of the charge level of the power bank battery 180 and/or whether charging is actively taking place.

The environment 100 may include additional computing devices and/or components, in various embodiments. Moreover, where components of a device described herein are referred to separately, it should be understood that components may be combined, in some embodiments.

Figure 2:
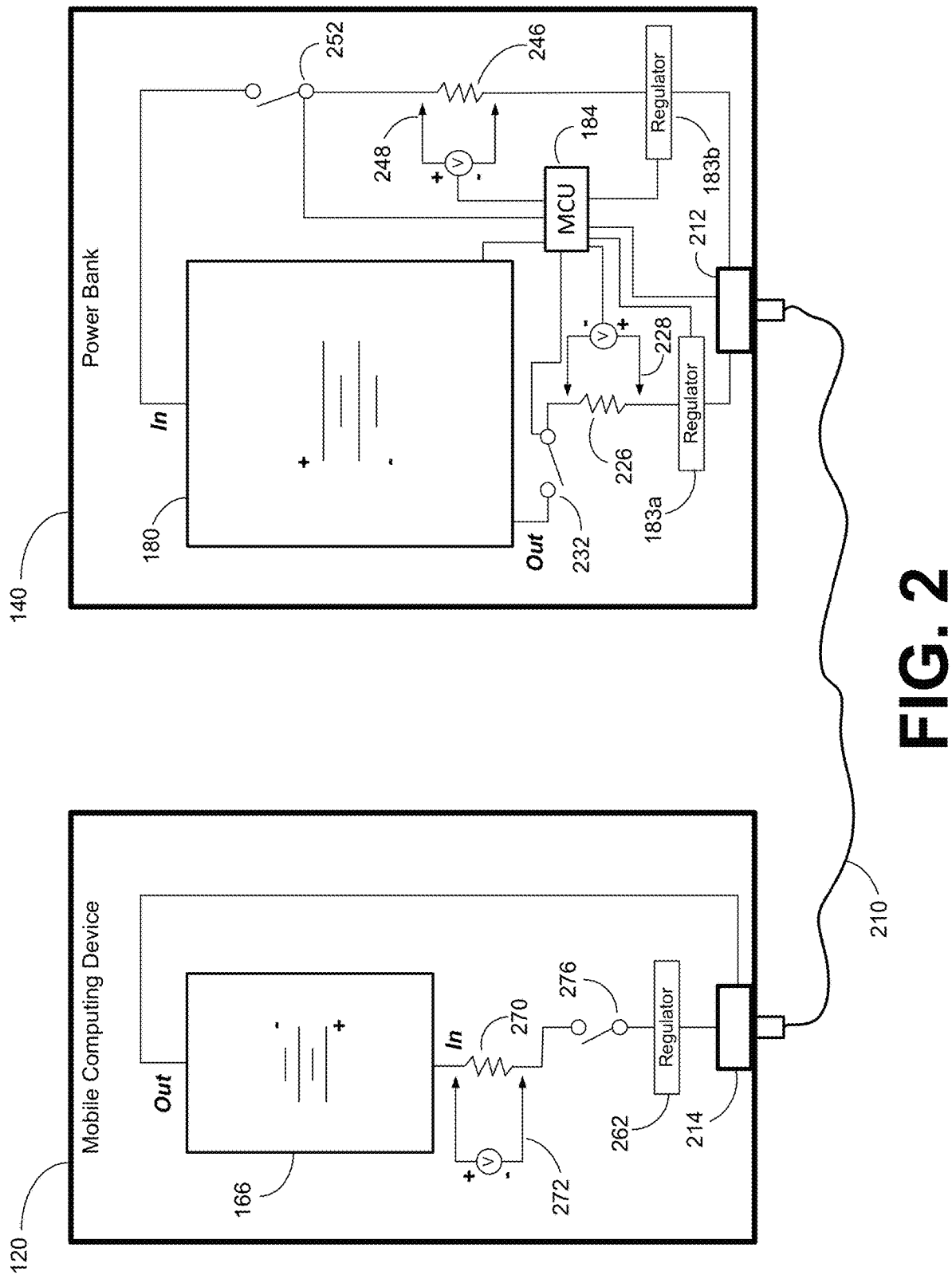
FIG. 2 illustrates example components of the power bank and the mobile computing device of FIG. 1, in accordance with one aspect of the present disclosure.

FIG. 2 illustrates example conventionally known electrical components of the mobile computing device 120 and power bank 140 of FIG. 1, suitable for use in the portable power bank devices described herein. Although a limited number of electrical components are described with respect to FIG. 2, these are merely provided for general illustration of the power banks 140 and methods described herein, and thus it should be understood that the mobile computing device 120 and/or power bank 140 may include additional, fewer, and/or alternate components to those described herein, in various embodiments (e.g., other electrical circuitry, and/or any of the components described with respect to FIG. 1). Thus, arrangements of the electrical components generally described herein may vary from the arrangement shown in FIG. 2.

At a high level, electrical components depicted in FIG. 2 facilitate supply of electric charge from the power bank battery 180 to the mobile computing device battery 166 via an electrical connection between the power bank battery 180 and the mobile computing device battery 166. The electrical connection between the power bank battery 180 and the mobile computing device battery 166 electrically connects the respective batteries thereof to facilitate the supply of charge from the power bank battery 180 to the mobile computing device battery 166. In some embodiments, at least some the electrical components described herein may be disposed in one or more integrated circuits in the mobile computing device 120 and/or in the power bank 140.

In the embodiment shown in FIG. 2, the electrical connection 210 is a wired electrical connection (e.g., a USB-C charging cable, micro-USB cable, Lighting cable, or other physical connecting structure) that connects an electrical port 212 of the power bank 140 to an electrical port 214 of the mobile computing device 120. Additionally or alternatively, in some embodiments, the electrical connection 210 may include a wireless electrical connection (e.g., Qi-standard wireless charging connection). Moreover, in some embodiments, the electrical connection 210 may be implemented by the same structure that provides the communicative connection(s) 144 as described with respect to FIG. 1. That is, a single connection between the mobile computing device 120 and the power bank 140 (e.g., a USB wired data/charging wired connection) may both electrically and communicatively connect the mobile computing device 120 and the power bank 140.

The power bank battery 180 supplies electric charge via an outflowing electric current from the power bank battery 180. An instantaneous power output of the power bank battery 180 can be calculated (e.g., by the power bank MCU 184) by multiplying an instantaneous value of the outflowing electric current by an instantaneous voltage of the power bank battery 180. Voltage of the power bank battery 180 (e.g., voltage across two terminals of the power bank battery 180) may be measured, for example, by the MCU 184 via a voltmeter disposed at the power bank battery 180. Outflowing current may be measured by the MCU 184 via use of a resistor 226 (e.g., a shunt resistor) which is electrically arranged in series with the power bank battery 180, and which has a known resistance. When current passes through the resistor 226, the MCU measures a voltage drop across the resistor 226 via a voltmeter 228. The ADC in the power bank MCU 184 may convert analog voltage measurements to digital voltage measurements. The MCU 184 may divide the voltage drop across the resistor 226 by the known resistance of the resistor 228 to determine the value of the electric current passing through the resistor 226 and hence, the value of the outflowing current of the power bank battery 180).

In some embodiments, control of the supply of electric charge from the power bank battery 180 is facilitated via a power bank switch 232. The switch 232 in an open state (as shown in FIG. 2) prevents the supply of electric charge from the power bank battery 180, whereas the switch 232 in a closed state allows the supply of electric charge. The switch 232 may be controlled, for example, by the power bank MCU 184 (e.g., the switch may automatically be closed based upon dynamic charging efficiency, as described herein). Additionally or alternatively, in some embodiments, the switch 232 may be controlled based upon communications transmitted to the power bank 140 by the mobile computing device 120, which communications may be based upon corresponding user input.

The power bank 140 includes a voltage regulator 183a (e.g., the voltage regulator 183 as shown in FIG. 1, for example a DC-to-DC voltage converter). The voltage regulator 183a may be configured to convert a first voltage of the power bank battery 180 (e.g., 3V, 3.6V, or 4.2V) to a second configured voltage of the electrical connection 210 (e.g., 5V for USB charging). Accordingly, in some embodiments, the voltage regulator 183a includes a step-up or "boost" converter configured to increase the voltage. Additionally or alternatively, in some embodiments, the voltage regulator 183a includes a step-down or "buck" converter to decrease the voltage (e.g., when the power bank battery 180 voltage is greater than the electrical connection 210 voltage). Effectively, voltage regulation by the voltage regulator 183a may vary based upon (1) the voltage of the power bank battery 180, and (2) the voltage associated with the electrical connection 210. Regulated electric current (e.g., having passed through the voltage regulator 183a) may be supplied to the electrical connection 210 by way of the power bank electrical port 212. Notably, by performing the measurement of outflowing current between the battery 180 and the voltage regulator 183a, the outflowing current measurement reflects outflowing current from the battery 180 itself (e.g., outflowing current from a terminal of the battery 180), thereby avoiding inaccuracies that may be caused by losses of energy and/or changes in value of the current occurring at the voltage regulator 183a.

The power bank 140 may additionally include a second, separate electrical pathway for facilitating supply of inflowing electric charge to the power bank battery 180 (e.g., inflowing electric charge from an AC wall outlet, vehicle charging port, and/or other source of charge for the power bank 140). Elements of this second pathway may generally be similar to the elements described herein for directing outflowing electric charge from the power bank battery 180. Accordingly, the second pathway may include, for example, a voltage regulator 183b (e.g., to convert a first voltage of an electrical connection supplying charge to the power bank 140, to a second voltage of the power bank battery 180). Electrical current, upon passing through the voltage regulator 183b may pass through a resistor 246 (e.g., a shunt resistor). Electric current passing through the resistor 246 may be measured in a manner similar to that described herein regarding outflowing current through the resistor 226 (e.g., by the MCU 184 via a voltmeter 248). Supply of inflowing electric charge to the battery 180 may be controlled via a switch 252.

Electrical current is received at the mobile computing device 120 from the electrical connection 210 by way of the mobile computing device port 214. The received electrical current may flow to a voltage regulator 262 of the mobile computing device 120. The voltage regulator 262 may be configured to convert the voltage of the electrical connection 210 (e.g., 5V for USB charging) to another voltage of the mobile computing device battery 166 (e.g., 3V, 3.6V, or 4.2V). Accordingly, in some embodiments, the voltage regulator 262 includes a step-down converter configured to decrease the voltage. Additionally or alternatively, in some embodiments, the voltage regulator 262 includes a step-up converter configured to increase the voltage.

Electric charge is received at the mobile computing device battery 166 by way of an inflowing electric current. Voltage of the mobile computing device battery 166 may be measured, for example, by a voltmeter in the battery 166. The value of the inflowing electric current may be measured via a resistor 270 (e.g., a shunt resistor) which is electrically arranged in series with the mobile computing device battery 166, and which has a known resistance. When current passes through the resistor 270, the mobile computing device 120 measures a voltage drop across the resistor 270 via a voltmeter 272. The ADC in the mobile computing device processor may convert analog measurements of voltage in the mobile computing device 120 to digital voltage values. The processor of the mobile computing device (e.g., processor 158) may divide the voltage drop across the resistor 270 by the known resistance of the resistor 270 to determine the value of the electric current passing through the resistor 270 and hence, the value of the inflowing current to the mobile computing device battery 166). Notably, by performing the measurement of inflowing current between the voltage regulator 262 and the battery 166, the inflowing current measurement reflects the inflowing current to the mobile computing device battery 166 itself (e.g., flowing into a terminal thereof), thereby accounting for potential losses of energy and/or changes in value of the current occurring at the voltage regulator 262. The processor of the mobile computing device 120 may calculate instantaneous power input to the mobile computing device battery 166 by multiplying an instantaneous value of the inflowing electric current by a corresponding instantaneous voltage of the mobile computing device battery 166.

In some embodiments, control of the supply of electric charge to the mobile computing device battery 166 is performed via a mobile computing device switch 276. The switch 276 in an open state (as shown in FIG. 2) prevents the supply of electric charge to the mobile computing device battery 166, whereas the switch 276 in a closed state allows the supply of electric charge. The switch 276 may be controlled, for example, by the mobile computing device 120 (e.g., by the processor 158 according to instructions from the power bank app 156, based upon dynamic charging efficiency). Additionally or alternatively, in some embodiments, the switch 276 may be controlled based upon communications transmitted to the mobile computing device 120 by the power bank 140.

Via the electrical arrangement as shown in FIG. 2, supply of electric charge from the power bank battery 180 to the mobile computing device battery 166 may be performed and controlled in manner that facilitates efficient use of the power bank 140, as will be understood from this detailed description.

Causes of Variation in Dynamic Charging Efficiency

At any point over a time interval while a power bank is providing charge to a mobile computing device (a "charging session"), the dynamic charging efficiency between the power bank battery and mobile computing device battery can be measured based upon comparison of an amount of power output by the power bank battery to an amount of power received to the mobile computing device battery ("power input"). More particularly, power input ($P_{in}$) is divided by power output ($P_{out}$) at a corresponding time to determine the charging efficiency. The charging efficiency may be represented as a ratio between 0 and 1.0 (or alternatively, as a percentage between 0% and 100%). For example, given $P_{out}$ of 10.5 W and $P_{in}$ of 7 W at a corresponding time, the charging efficiency at that time is approximately 0.67 or 67%.

Because at least some losses occur during any transfer of energy, the dynamic charging efficiency between the power bank battery and mobile computing device battery is always less than 100%. However, certain conditions in particular can be observed as reducing the charging efficiency, although the magnitudes of these efficiency losses can vary over time.

For one, efficiency varies significantly based upon the electrical connection by which the charging is performed. For example, optimal conditions of charging using a USB connection may produce efficiency of 70% (i.e., power received at the mobile computing device battery is 70% of the power output of the power bank battery), where efficiency losses include losses in the range of 1%-20% over the USB cable itself. By contrast, optimal conditions in wireless charging may only produce efficiency of 50%, where losses are impacted by the thicknesses of any cases in which the mobile computing device and the power bank are held, the distance between the mobile computing device and the power bank, etc. To account for the differences in typical charging efficiencies according to various different electrical connections, different charging efficiency thresholds are envisioned for the different electrical connections (e.g., a first efficiency threshold particular to USB 2.0 charging, a second efficiency threshold particular to USB 3.0 charging, and a third efficiency threshold particular to some or all Qi-standard wireless charging means).

Additionally, charging efficiency typically decreases as the fuel gauge of the device receiving charge increases. For example, the closer the mobile computing device is to 100% fuel gauge, the lower the charging efficiency will typically be (e.g., as a result of energy losses at voltage regulators at the mobile computing device and/or at the power bank). When the mobile computing device fuel gauge is low (e.g., 20%, 30%, 40%), the mobile computing device can typically accept relatively efficient charging. However, as the mobile computing device approaches full charge (100% fuel gauge), charging current typically tapers off, and more time and energy is required to provide the final portions of charging to the mobile computing device (e.g., the final 20% of charge, the final 10%, 5%, 1%, etc.). This phenomenon will be explained in further detail in conjunction with the discussions of FIGS. 3-5 in subsequent portions of this detailed description.

Furthermore, charging efficiency associated with any device is typically affected by the state of health of the device battery (e.g., a power bank battery providing charge or a mobile computing device battery receiving charge). As the battery ages and the actual capacity of the battery decreases, internal resistance builds up in the battery. As a result, an increasing amount of energy is lost to heat while charging. Applied to the methods and apparatus herein, when increases in internal resistance of the power bank battery are compounded by increases in internal resistance of the mobile computing device, significant efficiency losses are encountered.

Although most mobile computing device users do not find efficiency losses particularly concerning when the mobile computing device is being charged by a stationary power source (e.g., an AC wall outlet, vehicle charging port, etc., which can provide exponentially more charge than the mobile computing device needs), efficiency losses are particularly concerning when experienced in a power bank. These efficiency losses significantly reduce the effective or "real" amount of charge that the power bank can provide on a single full or partial charge.

Calculating Power Output and Power Input

The dynamic charging efficiency at any point during a charging session between a power bank (e.g., power bank 140 from FIGS. 1 and 2) and a mobile computing device (e.g., mobile computing device 120 from FIGS. 1 and 2) can be determined by dividing the power input to the mobile computing device battery ($P_{in}$) by the power output of the power bank battery ($P_{out}$). The dynamic charging efficiency is represented as a ratio or percentage.

Instantaneous power output $P_{out}$ is calculated by multiplying the voltage across two terminals of the power bank battery ($V_{out}$, e.g., in volts (V)) by the outflowing current of the power bank battery ($I_{out}$, e.g., in amperes (A)). In some embodiments, the power bank MCU measures instantaneous outflowing current $I_{out}$ via a resistor electrically arranged in series with the power bank battery (e.g., a shunt resistor 226, as described with respect to FIG. 2). The resistor has a known electrical resistance (e.g., 0.01 Ohms ($\Omega$)), and the electrical resistance of the resistor is included in memory of the power bank MCU. The power bank MCU measures, via a voltmeter, a voltage drop across the resistor when current passes from the battery through the resistor. For example, for the 0.01$\Omega$ shunt resistor, the MCU may measure a drop of 20 millivolts (mV) across the shunt resistor. The MCU divides the voltage drop by the known resistance of the shunt resistor to determine the electric current passing through the resistor and hence, the value of the outflowing current from the power bank battery). For example, for the MCU measuring a drop of 20 mV across the 0.01$\Omega$ shunt resistor, the MCU determines an electric current of 2 A. The outflowing current $I_{out}$ is multiplied by the corresponding voltage of the power bank battery to determine the power output $P_{out}$. For example, given the 2 A current and a corresponding power bank battery voltage of 3.9V, $P_{out}$ is determined to be 7.8 W.

Similar measurements and calculations may apply to calculation of instantaneous power input at the mobile computing device battery ($P_{in}$). The power input $P_{in}$ can be calculated as the product of an instantaneous voltage of the mobile computing device battery ($V_{in}$) multiplied by the corresponding electric current received at mobile computing device battery ($I_{in}$). As an example, given a $V_{in}$ of 3.6V and $I_{in}$ of 1.5 A, the power input $P_{in}$ is 5.4 W. Following the above example where corresponding $P_{out}$ is 7.8 W, the dynamic charging efficiency is 5.4 W/7.8 W, or approximately 0.69 (69%).

In some embodiments, the current $I_{in}$ of the mobile computing device battery is measured via similar circuitry as described herein with respect to the power bank (e.g., by measuring voltage drop across a resistor having a known resistance, as described with respect to FIG. 2). In any case, modern mobile computing devices (e.g., smartphones) typically expose an API comprising functions for measuring voltage, current, power, and/or other electrical characteristics of the mobile computing device. Accordingly, obtaining values of electrical characteristics of the mobile computing device (e.g., $V_{in}$, $I_{in}$, and/or $P_{in}$) may include one or more API function calls performed, for example, a dedicated software application at the mobile computing device for using a power bank (e.g., the power bank application 156 as described with respect to FIG. 1).

Variation in Efficiency Over a Charging Session

Figure 3:
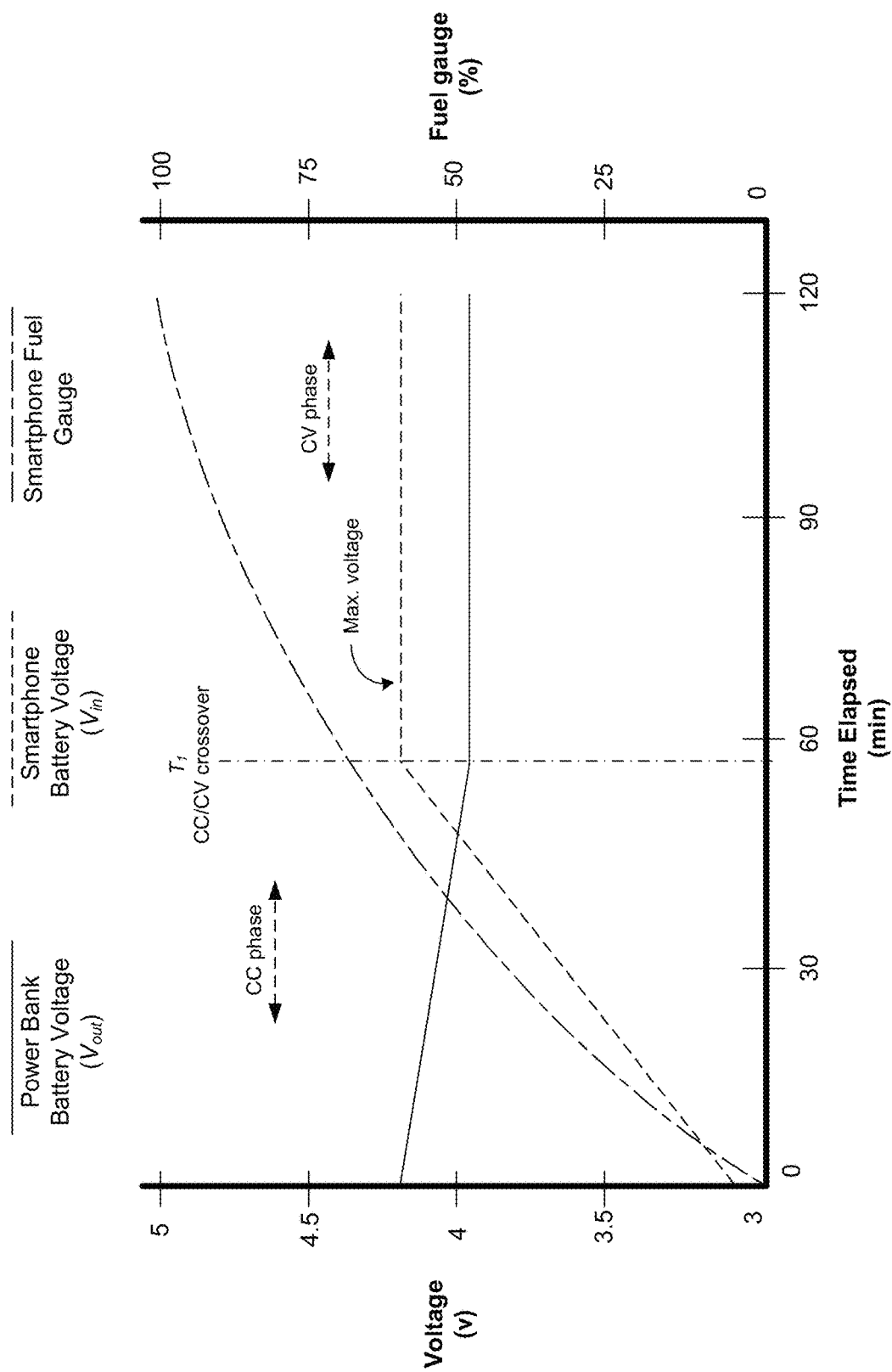
FIG. 3 illustrates an example chart associated with voltage observed while charging a mobile computing device via a power bank, in accordance with one aspect of the present disclosure.
Figure 4:
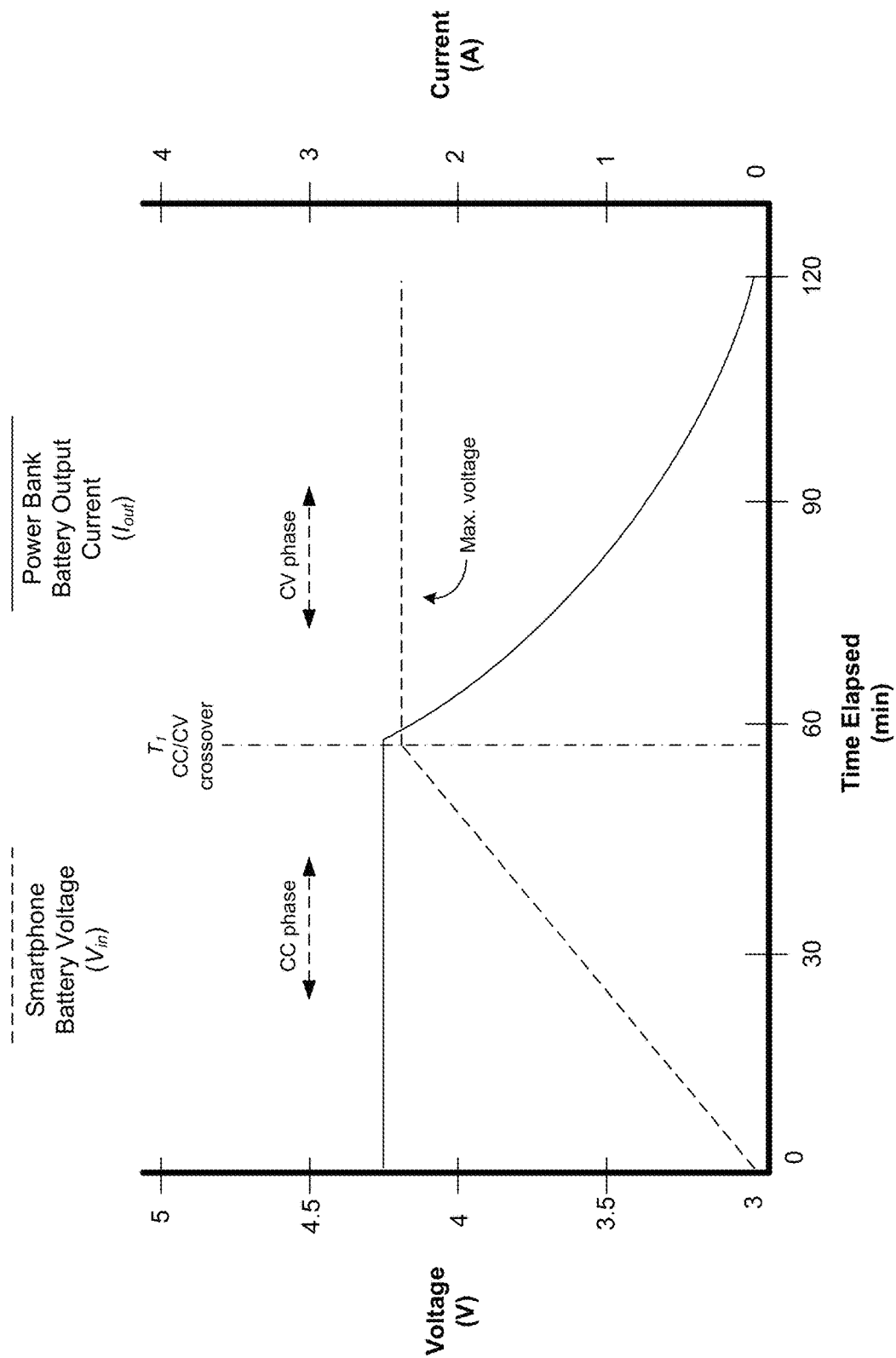
FIG. 4 illustrates another chart associated with voltage and current observed while charging the mobile computing device via the power bank, in accordance with one aspect of the present disclosure.
Figure 5:
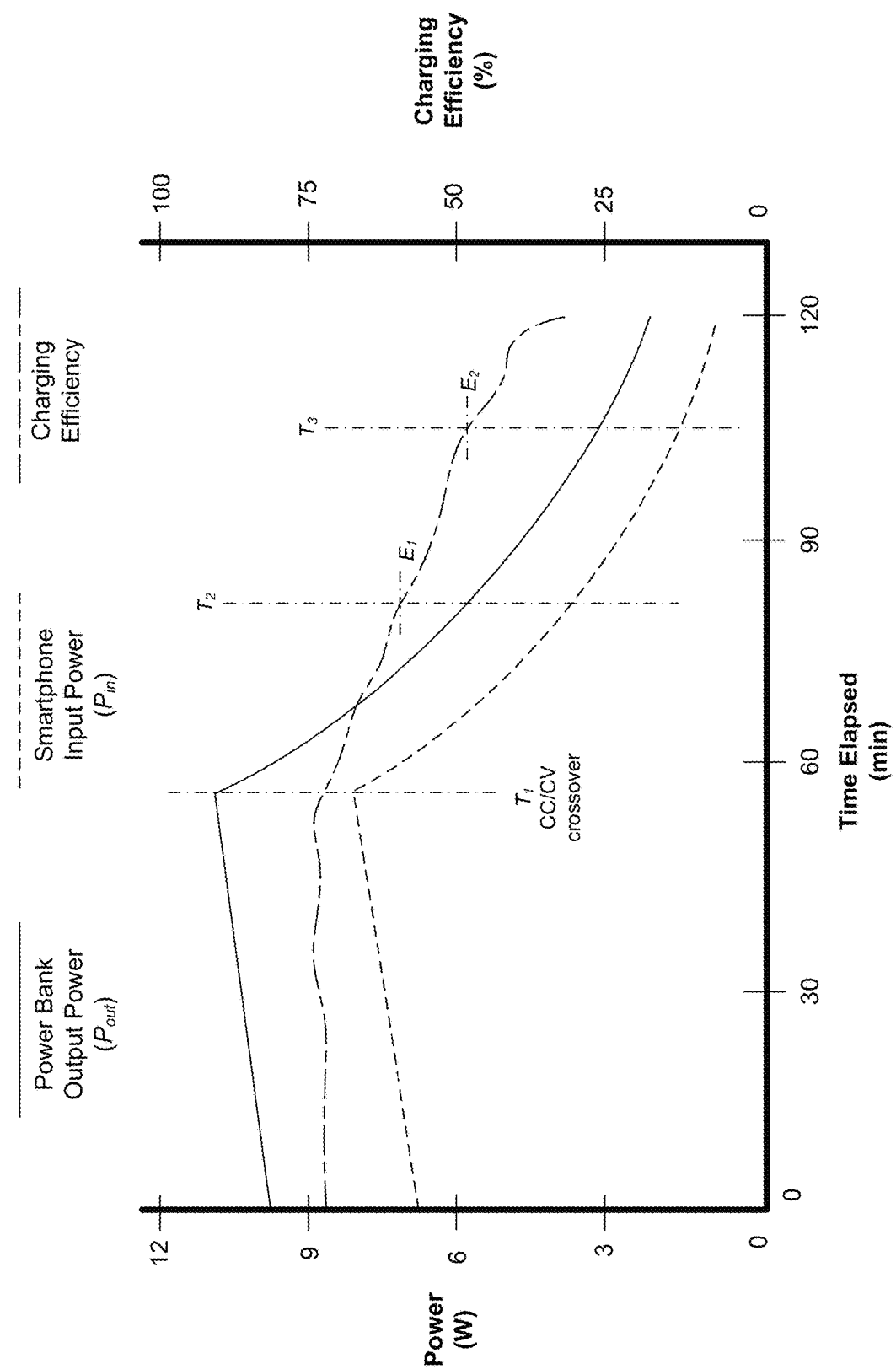
FIG. 5 illustrates yet another example chart associated with power and efficiency observed while charging the mobile computing device via the power bank, in accordance with one aspect of the present disclosure.

FIGS. 3-5 illustrate variations in electrical characteristics over an example USB charging session during which a power bank supplies electric charge to a mobile computing device (particularly, a smartphone, although other mobile computing devices are equally possible). Particularly, FIGS. 3-5 illustrate variations in voltage, current, power, and charging efficiency over the charging session. Techniques of the present disclosure may be applied to the example charging session, for example to cause interruption of charging before the end of the charging session to thereby prevent relatively inefficient use of the power bank.

The example charging session of FIGS. 3-5 is defined by a time interval having a duration of approximately 120 minutes, and the charging session uses a constant-current constant-voltage (CC/CV) charging protocol, which will be described in further detail herein. Other charging protocols are possible. In any case, over the charging session (e.g., over the 120 minute time interval), the smartphone battery gains charge while the power bank battery loses charge. Specifically, in this example, a "full charging" is shown, in which the smartphone starts at 0% charge at minute 0, and reaches 100% charge at approximately minute 120. A corresponding decrease in the fuel gauge of the power bank may, for example, be a decrease from 100% to 60%, from 80% to 35%, from 50% to 10%, etc. As will be shown in FIG. 3, increase in charge level of the smartphone over the charging session is typically not linear.

Although it can be assumed for the sake of simplicity that the example charging session in FIGS. 3-5 is a full charging of the smartphone over a continuous 120 minute time interval (i.e., without interruption). However, a charging session may end at any time if the supply of charge to the smartphone is deliberately interrupted (e.g., by physically disconnecting a USB cable from the smartphone, or by removing the smartphone from a wireless charging pad). Another charging session may begin when charging resumes at a subsequent time (e.g., when the USB cable is reinserted into the ports of the smartphone and the power bank the smartphone, or when the smartphone is returned to the wireless charging pad). Accordingly, a charging session as described herein may correspond to any suitable time interval (e.g., 1 minute, 10 minutes, 25 minutes, 150 minutes, etc.), and a charging session may charge a smartphone from 0% to 30%, from 10% to 55%, from 38% to 64%, from 53% to 100%, or from any starting percentage to any final percentage greater than the starting percentage.

Still further, it is noted that the behavior of the electrical characteristics as shown in FIGS. 3-5 (e.g., the resulting efficiency) correspond most closely to wired USB charging sessions. However, it should be understood that the electrical characteristics described herein may exhibit similar behaviors for other means of charging, such as Lightning charging, Qi-standard wireless charging means, etc. Accordingly, techniques described herein may be applied during charging sessions that take place via any suitable charging means, including any charging means described herein.

First referring to FIGS. 3 and 4, a CC/CV charging protocol can be understood. Generally, CC/CV consists of two phases, specifically a first "Constant Current" (CC) charging phase and a second "Constant Voltage" (CV) charging phase. In the first "Constant Current" (CC) charging phase, the device battery providing charge supplies a outflowing electric current ($I_{out}$) of a generally steady amount (e.g., 2.5 A), and the device battery receiving charge (e.g., the smartphone battery) receives an inflowing electric current ($I_{in}$) of a generally steady amount (e.g., nominally 2.5 A, but potentially less based on energy losses between the power bank battery and smartphone battery). While the smartphone battery receives charge in the CC phase, the voltage of the smartphone battery ($V_{in}$) may increase from a minimum voltage (e.g., 3V at 0% fuel gauge, as is common in lithium batteries) toward a maximum voltage (e.g., 4.2V, as is common in lithium batteries). Conversely, as the device battery supplying charge (i.e., the power bank battery) loses charge, the voltage of the power bank battery ($V_{out}$) may decrease. The maximum voltage of the smartphone battery may be achieved, for example, when the smartphone battery is at approximately 70% fuel gauge, as shown in FIG. 3. Alternatively, maximum voltage may be achieved at 50% battery fuel gauge, 60% fuel gauge, 80% fuel gauge, etc.

In any case, once the smartphone battery reaches maximum voltage at a first time ($T_1$), a "CC/CV crossover" occurs, and the second "Constant Voltage" (CV) charging phase begins. In the CV phase, the maximum voltage of the smartphone battery is maintained (i.e., constant or near-constant) while the power bank battery outflowing current $I_{out}$ (and in turn, the mobile computing device battery inflowing current $I_{in}$) decreases from an initial value (e.g., 2.5 A outflowing current in the moment immediately after crossover) toward 0 A as the smartphone fuel gauge approaches 100%, as can be observed from FIGS. 3 and 4.

According to typical charging methods, when the inflowing current $I_{in}$ is equal to or below a predetermined threshold that signifies that charging has tapered off sufficiently (e.g., 0.05 A at minute 120, or a different near-zero current value), the second and final charging phase is complete. Consequently, the smartphone and/or the power bank MCU causes cutoff of the supply of charge to the power bank battery (e.g., via a switch in the power bank or in a charging adaptor of the charging source). By contrast, the techniques of this disclosure advantageously facilitate interruption of the supply of electric charge based upon charging efficiency, where interrupting the supply of electric charge may occur before the current tapers off to near-zero current.

Because $V_{out}$ and $I_{out}$ of the power bank battery vary over time, the power output $P_{out}$ of the power bank battery also varies. Similarly, because $V_{in}$ and $I_{in}$ of the smartphone battery vary over time, the power input $P_{in}$ varies. The variation of $P_{out}$ and $P_{in}$ can be observed in FIG. 5. From minute 0 until approximately minute 55 during the CC phase, efficiency stays relatively steady at approximately 70%. However, following the crossover to the CV phase at $T_1$, the efficiency gradually declines. Particularly, the efficiency falls to a first efficiency mark ($E_1$) of 60% at a second time ($T_2$) at approximately minute 80. Subsequently, as the charging session continues, the efficiency falls to a second efficiency mark ($E_2$) of 50% at a third time ($T_3$) at approximately minute 105. Referring back to FIG. 3, it is observed that at minute 105, the smartphone fuel gauge is less than 100%. The first and second efficiency marks may be reached, for example, when the smartphone is at 90% and 95% fuel gauge, respectively.

The methods and apparatus herein improve upon existing charging methods by monitoring efficiency and providing for interruption of the charging session based upon low efficiency, to thereby conserve the power bank's charge supply. Charge may be interrupted, for example, when the efficiency falls to a value at or below a threshold (e.g., corresponding to the first efficiency mark $E_1$ or the second efficiency mark $E_2$ as shown in FIG. 5). The efficiency threshold(s) that are used will vary based upon the means of charging used. For example, in a USB charging session where 70% efficiency is often achieved, it may be reasonable to bring about interruption of charging at 60% or 50% efficiency. By contrast, in a wireless charging session in which efficiency higher than 50% is rarely achieved, more reasonable thresholds may be 45%, 40%, 35%, etc. In some embodiments, efficiency thresholds for respective charging means are set by a user via instructions (e.g., a dedicated software application) executing at the mobile computing device (i.e., the user assigns the threshold value(s)). Additionally or alternatively, efficiency thresholds may further include values programmed and stored at the power bank MCU.

Example User Interfaces

Figure 6A:
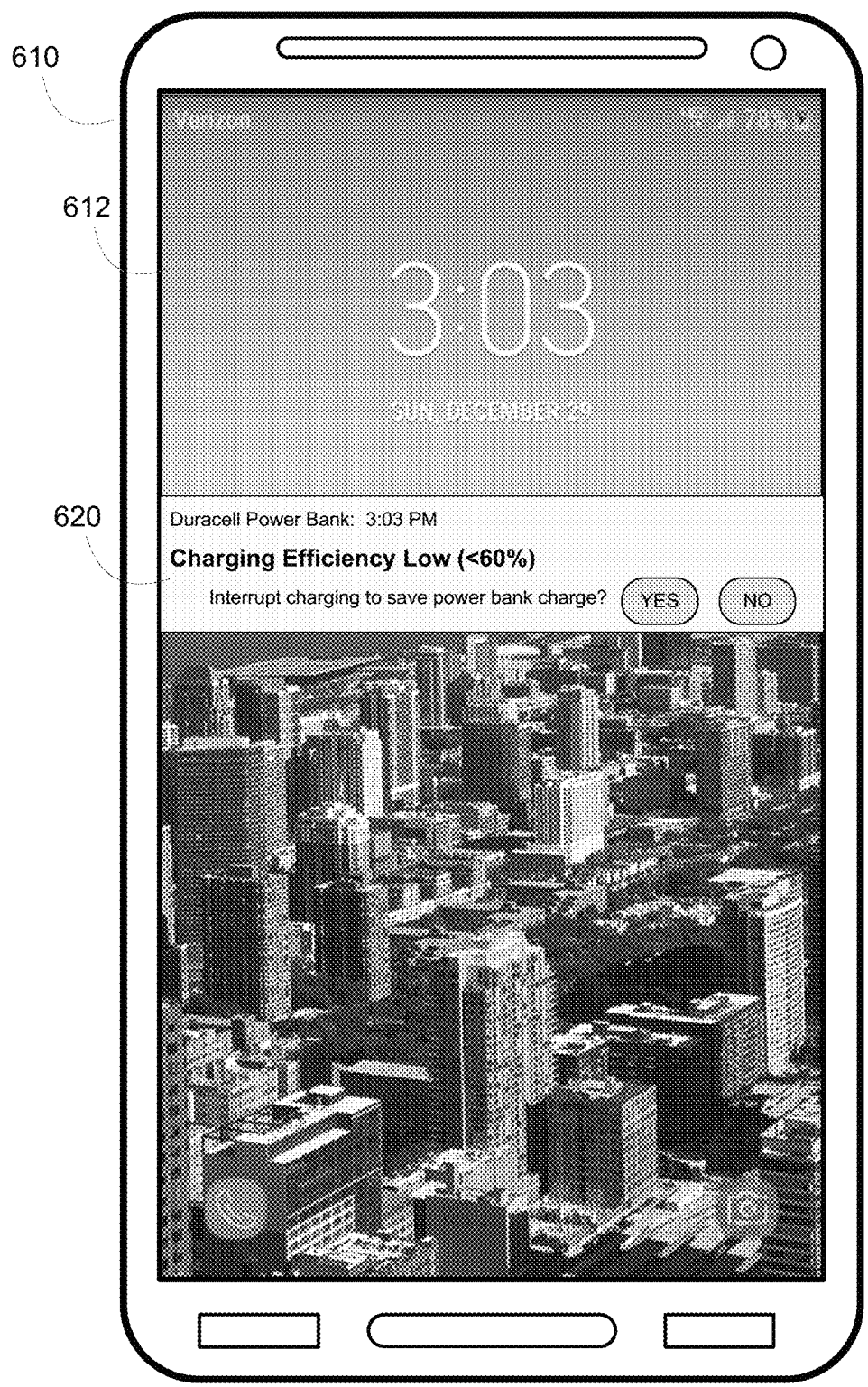
FIGS. 6A-6C illustrate example graphical user interfaces of a mobile computing device, in accordance with one aspect of the present disclosure.
Figure 6B:
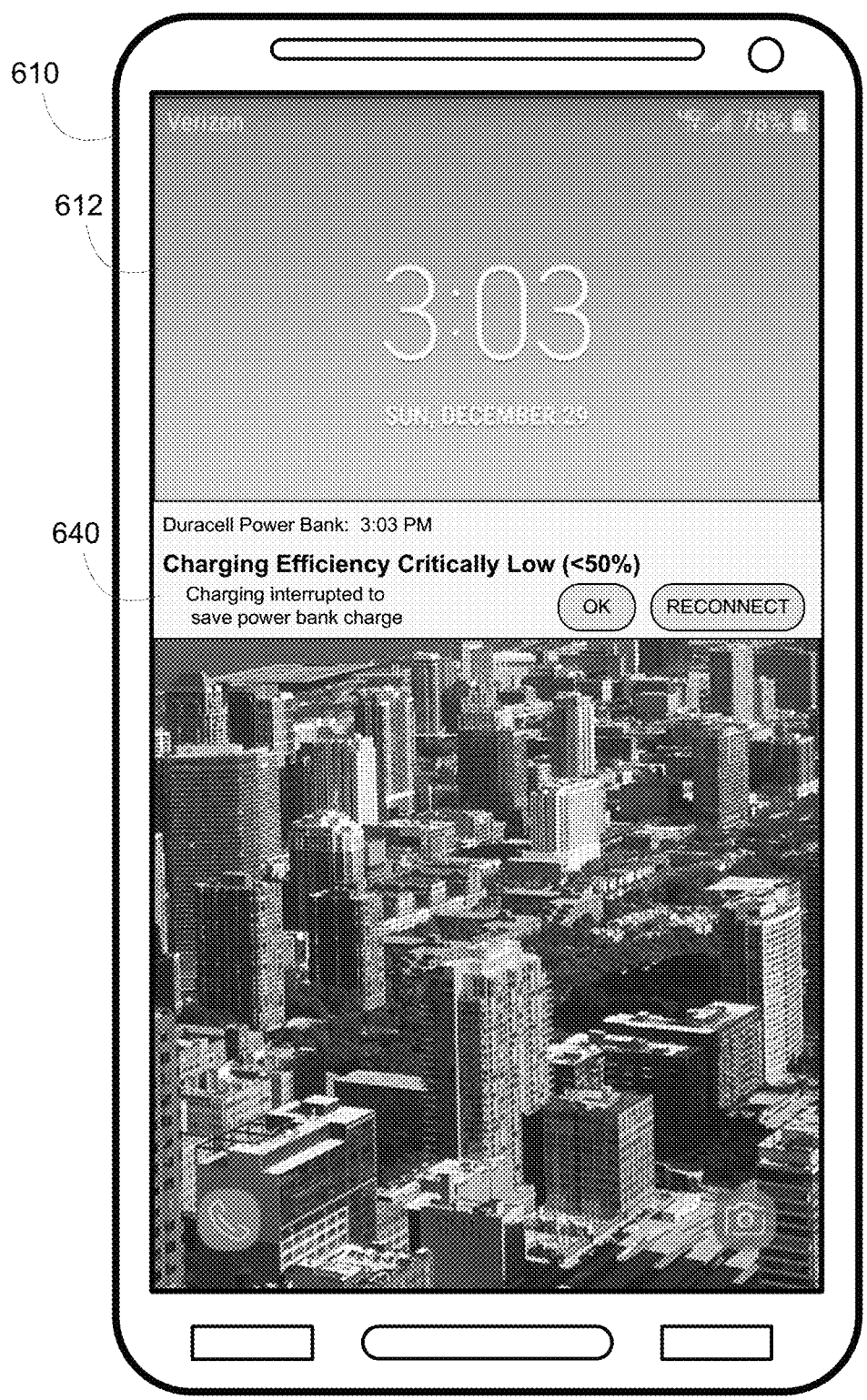

FIGS. 6A and 6B illustrate example notifications that may be displayed at a mobile computing device 610 in the context of a charging session in which a power bank (i.e., power bank battery, not pictured) supplies charge to the mobile computing device 610 (i.e., to a battery thereof). The mobile computing device 610 may, for example, be the smartphone as described with respect to FIGS. 3-5, or another suitable mobile computing device (e.g., any mobile computing device 120 described with respect to FIG. 1 or 2). Values displayed in FIGS. 6A and 6B may generally be determined based upon determinations performed by the mobile computing device 610, by the power bank, or by some combination thereof. In some embodiments, the graphical user interfaces of FIGS. 6A and 6B are displayed via a dedicated power bank application executing at the mobile computing device 610 (e.g., power bank application 156 of FIG. 1).

FIG. 6A illustrates a screen 612 (e.g., touchscreen display) of the mobile computing device 610, the screen 612 displaying a first graphical user interface 620. The graphical user interface 620 indicates that the charging efficiency has fallen to a value at or below a first efficiency threshold of 60%. The graphical user interface 620 provides an option of whether or not to cause interruption of the charging session (i.e., interruption of the supply of charge from the power bank battery to the battery of the mobile computing device 610). As can be observed from the battery icon in the upper-right corner of the screen 612, the mobile computing device 610 continues to charge while the graphical user interface 620 is displayed and before any user interaction therewith is received.

In response to a user interaction to interrupt the charging session ("YES"), the charging session is interrupted (e.g., via a charge control switch at the mobile computing device 610 and/or at the power bank). Alternatively, in response to a user interaction to allow the charging session to continue ("NO"), no action to interrupt the charging session is performed, and the graphical user interface 620 is dismissed. Of course, if the user deliberately disconnects the mobile computing device 610 from the power bank upon seeing the graphical user interface 620 (e.g., unplugs a USB cable used to perform the charging, or removes the mobile computing device 610 from a wireless charging pad), the charging session is thereby interrupted.

FIG. 6B illustrates the screen 612 of the mobile computing device 610, the screen 612 displaying a second graphical user interface 640. The graphical user interface 640 indicates that the charging efficiency is "critically low," and that the charging session has been interrupted due to the critically low efficiency. The charging session may be interrupted even if, for example, the power bank and the mobile computing device 610 remain electrically and communicatively connected. In response to a user interaction to accept the interruption of the charging session ("OK"), the graphical user interface 640 is dismissed. Alternatively, in response to a different user interaction ("RECONNECT"), the supply of electric charge is resumed, despite the potential for continued decrease in charging efficiency.

Any number of efficiency thresholds may be set to promote efficient use of the power bank battery, in various embodiments. Furthermore, additional or alternative graphical user interfaces are possible, in various embodiments. For example, the push notifications of FIGS. 6A and 6B may be substituted or supplemented with full-screen displays by a power bank application.

Figure 6C:
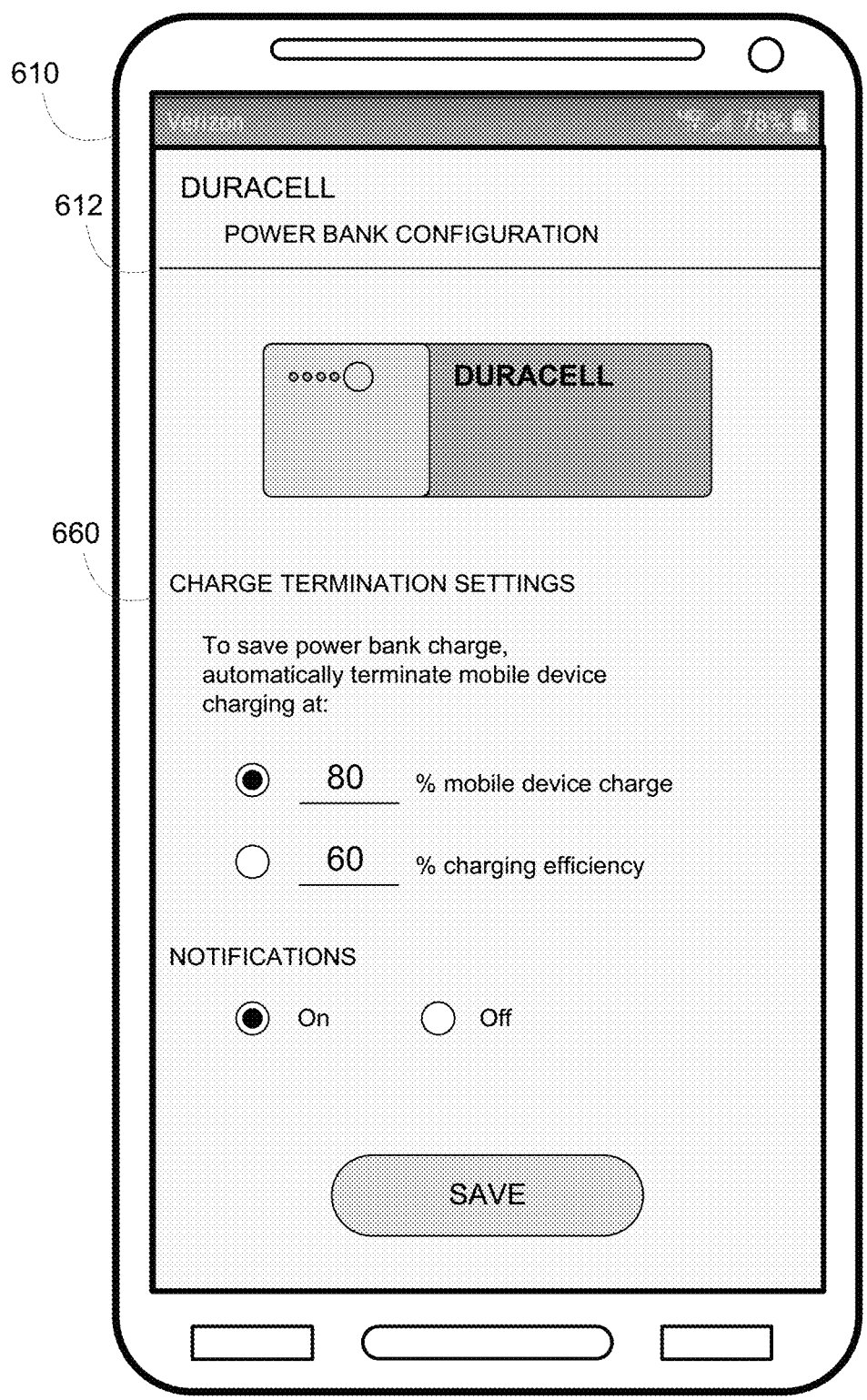

FIG. 6C illustrates the screen 612 of the mobile computing device 610, the screen 612 displaying a third graphical user interface 660. The graphical user interface 660 allows the user of the mobile computing device 610 to configure charge termination settings for the power bank and the mobile computing device 610 being charged therewith. The user may, for example, select an radio button (or another suitable graphical user interface element) to cause charging to be automatically terminated when the mobile computing device 610 is at a particular charge level configured by the user (e.g., 80%, 70%, 60%, 85%, 90%, etc.). Additionally or alternatively, the user may select another radio button to cause charging to be automatically terminated when dynamic charging efficiency is at or below a threshold value configured by the user (e.g., 60%, 55%, 40%, 65%, etc.). The graphical user interface 660 further allows the user of the mobile computing device 610 to manage notification settings. Selection of the "On" radio button may, for example, allow the power bank application to provide the notifications as described with respect to FIGS. 6A and/or 6B. Alternatively, selection of the "Off" radio button may disable notifications (e.g., notifications are not provided to the user, even when charging is automatically terminated).

Additional or alternative user interfaces may provide similar information and similar controls to those shown in FIGS. 6A-6C, and/or may provide other charging-related information described herein. Furthermore, user interface techniques may be implemented that use audio input/output via a microphone and/or speaker of the mobile device 610, in various embodiments, to communicate audio push notifications.

Example Flow Diagram

Figure 7:
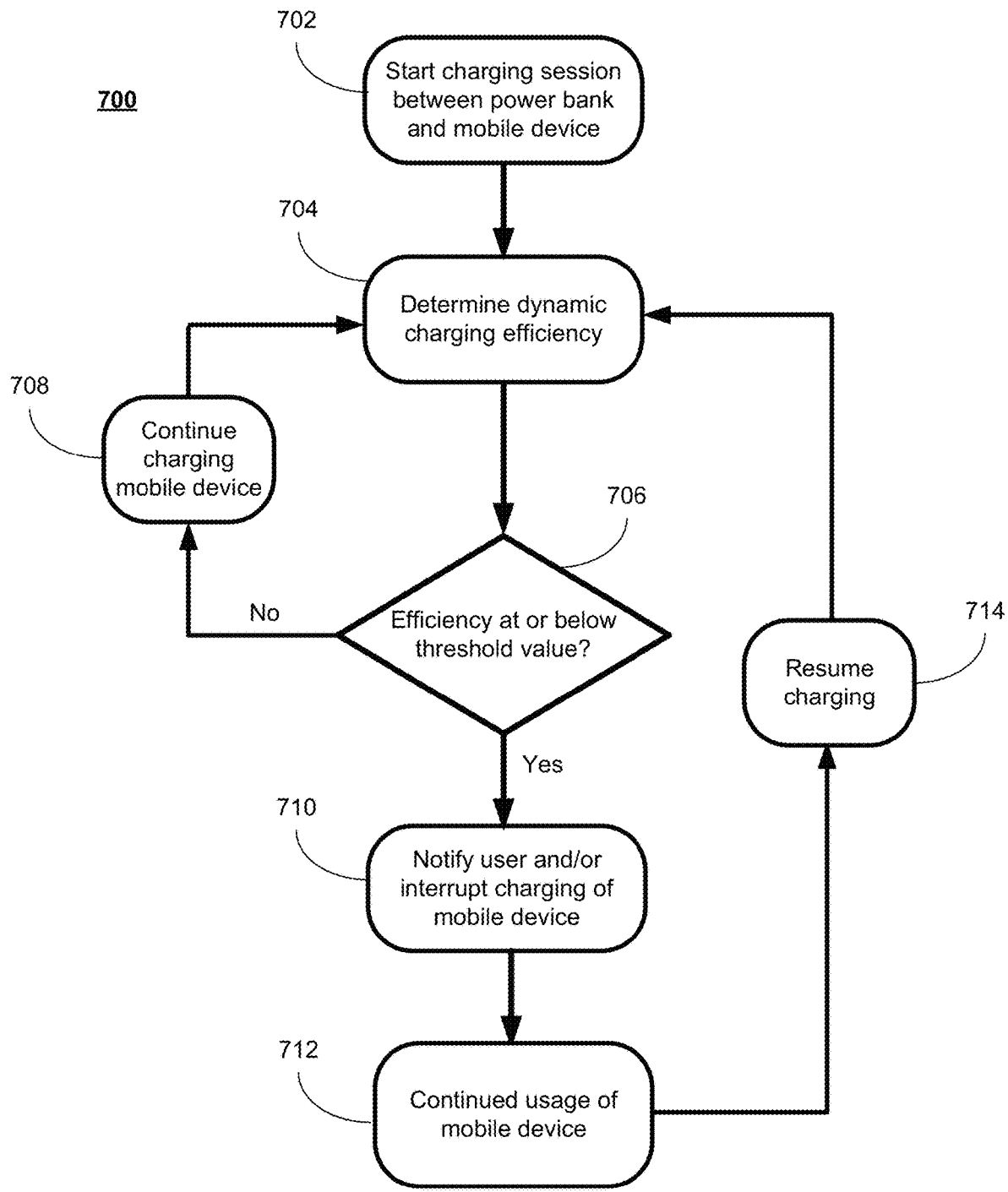
FIG. 7 illustrates an example flow diagram, in accordance with one aspect of the present disclosure.

FIG. 7 depicts a flow diagram 700 associated with monitoring charging efficiency over a charging session between a power bank and a mobile computing device (e.g., power bank 140 and mobile computing device 120 as described with respect to FIGS. 1 and 2). As will be described herein, actions of the flow diagram 700 may correspond to operations of the power bank (e.g., power bank MCU and/or communication), operations of the mobile computing device (e.g., mobile computing device processor and communication module), or combinations of both the mobile computing device and power bank. The charging session may be a wired charging session or a wireless charging session. Communications between the power bank and mobile computing device described or implied herein may include wired communications (e.g., via a shared USB charging/data connection) and/or wireless communications (e.g., wireless RF communications).

A charging session begins between the power bank and mobile computing device (702). The charging session begins, for example, when an electrical connection is formed between a battery of the power bank and a battery of the mobile computing device (e.g., a USB cable connection, Lightning cable connection, other wired electrical connection, Qi-standard wireless charging connection, other wireless electrical connection, etc.). Additionally, a communicative connection is formed between the power bank and mobile computing device. The communicative connection may be formed before, at the same time of, or after the forming of the electrical connection. In some embodiments, the communicative connection is a RF communications connection. Alternatively, in some embodiments, the communicative connection is a wired communicative connection (e.g., a USB data connection). In some embodiments, the communicative connection and the electrical connection are provided by the same structure (e.g., USB data/charging connection).

During the charging session, a dynamic charging efficiency is determined (704). Particularly, the dynamic charging efficiency is determined based upon instantaneous power input at the mobile computing device battery divided by corresponding power output power bank battery.

The determination of the dynamic charging efficiency may include various actions performed by the power bank, by the mobile computing device, or by a combination of the power bank and the mobile computing device. For example, in some embodiments, the power bank determines the dynamic charging efficiency based upon (1) its own instantaneous battery power output, and (2) a received signal indicating instantaneous power input at the mobile computing device battery. Alternatively, in other embodiments, the mobile computing device determines the dynamic charging efficiency, based upon (1) the instantaneous power input to the mobile computing device battery, (2) a received signal indicating instantaneous power output of the power bank battery. Effectively, either device can determine its own battery power input or power output, and receive an indication of battery power input or power output from the other of the two devices (i.e., the other of the power input and power output, from the other of the power bank and the mobile computing device), such that an application as described herein can permit calculations at the mobile computing device or the power bank, depending on the specific embodiment.

Moreover, in embodiments in which the charging session uses certain charging protocols, a constant nature of current and/or voltage can be utilized to determine a power value. For example, at the time of starting CC/CV charging, the mobile computing device may receive an indication of initial output current from the power bank battery. Because current is held generally constant in CC phase until CC/CV crossover, the mobile computing device only needs to receive an indication of instantaneous power bank battery voltage to determine instantaneous power output of the power bank battery. That is, the constant current value can be used for the power output determination until CC/CV crossover. Similarly, if the power bank receives an indication that the CV phase of CC/CV charging has occurred, the power bank can determine power input of the mobile computing device battery by receiving an indication of input current of the mobile computing device battery, in combination with a constant voltage of the mobile computing device battery.

In any case, one or both of the power bank and the mobile computing device can determine the dynamic charging efficiency. The power bank may transmit an indication of the dynamic charging efficiency to the mobile computing device, or vice versa, such that dynamic charging efficiency is calculated at the mobile computing device and transmitted to the power bank.

The dynamic charging efficiency is compared to a threshold value to determine whether the dynamic charging efficiency is at or below the threshold (706). The comparison may be performed at the power bank, at the mobile computing device, or both.

If the dynamic charging efficiency is not at or below the threshold value ("No," i.e., the efficiency is above the threshold), the charging session is allowed to continue (708). Monitoring of charging efficiency may continue such that further efficiency loss is detected if it eventually occurs.

If the dynamic charging efficiency is at or below the threshold at action 706 ("Yes"), subsequent actions are taken to notify the user of the mobile computing device, and/or to interrupt the charging session (710). Particularly, if the power bank determines that the dynamic charging efficiency is below the threshold, the power bank (1) interrupts the charging session, and/or (2) transmits and/or pushes an indication of the dynamic charging efficiency to the mobile computing device (e.g., causing display of a push notification screen of a mobile computing device application indicating that charging has been interrupted, or to provide the user the choice of whether to do so). If the mobile computing device determines that the dynamic charging efficiency is below the threshold (or receives an indication thereof from the power bank), the mobile computing device (1) interrupts the charging session, if the charging session has not already been interrupted by the power bank, and/or (2) displays an indication of the dynamic charging efficiency and/or the interruption of the charging session (e.g., displays a push notification or a screen of a mobile computing device application).

In cases in which the supply of charge has been interrupted (e.g., automatically or in response to a user interaction), continued usage of the mobile computing device may occur after interruption of the charging session (712). As a result of continued usage of the mobile computing device, the fuel gauge of the mobile computing device may once again be depleted. In these cases, if the mobile computing device and power bank remain electrically connected (e.g., the USB charging cable remains plugged in to both devices), it is possible that charging may be permitted to resume at a later time once the mobile computing device battery has been partially depleted (714). That is, because charging is generally more efficient when the mobile computing device fuel gauge is lower, it is possible that charging can resume if charging can be performed at an efficiency higher than the efficiency threshold. To determine whether charging can resume, the power bank may temporarily and briefly resume the supply of charge to the mobile computing device battery, to measure efficiency via the techniques described herein. If efficiency is above the threshold, the supply of charge is resumed, and the monitoring of dynamic charging efficiency continues at action 704.

Order of actions of the flow diagram 700 may vary from the order described herein. Furthermore, the flow diagram 700 may include additional, fewer, and/or alternate actions, in various embodiments. For example, if the power bank runs out of charge, actions of the flow diagram 700 will cease until the power bank receives at least some charge.

Example Methods

Figure 8:
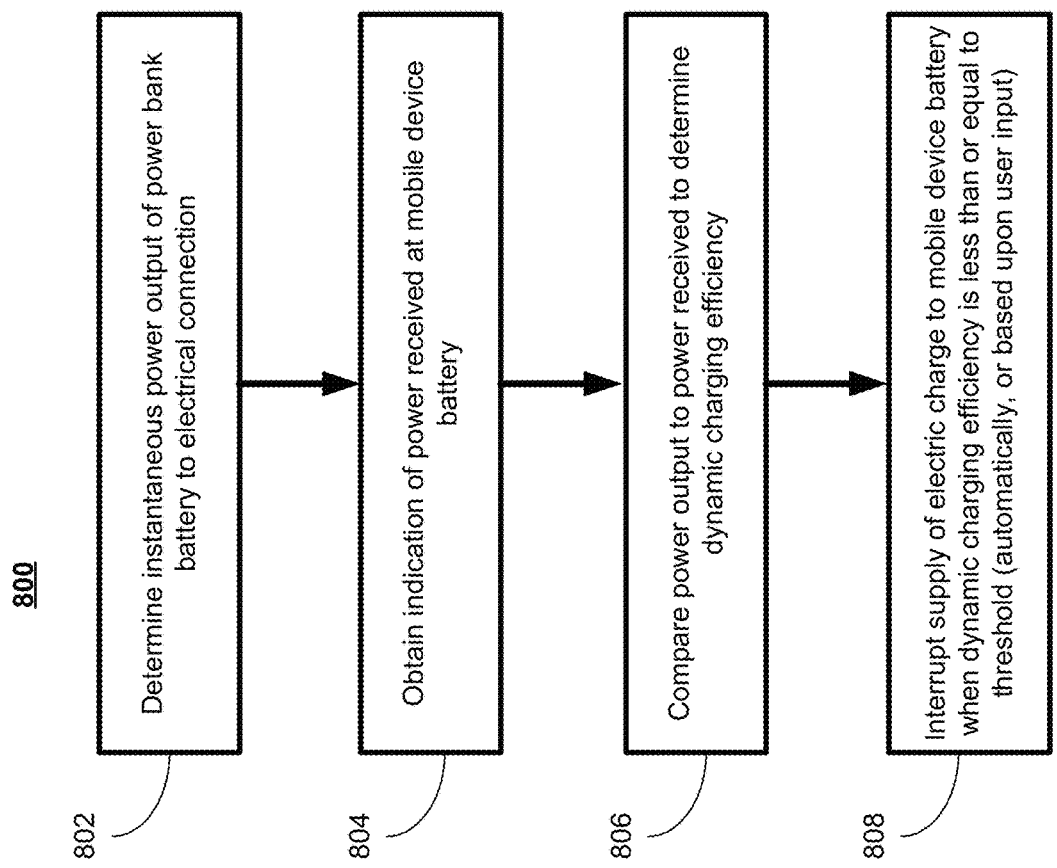
FIG. 8 illustrates an example method associated with a power bank, in accordance with one aspect of the present disclosure.

FIG. 8 depicts a block diagram corresponding to an example method 800 for determining dynamic charging efficiency via a power bank (e.g., the power bank 140 as described with respect to FIG. 1 or 2). At least some actions of the method 800 may correspond to actions in the flow diagram 700 of FIG. 7. Actions of the power bank in the method 800 may be performed by the power bank MCU (e.g., MCU 184 in FIG. 1) and/or communication module (e.g., communication module 190 in FIG. 1).

The method 800 includes determining an instantaneous power output of the power bank battery to an electrical connection with a mobile computing device to which the power bank supplies charge (802). Particularly, the power output is determined while the power bank is supplying charge to the mobile computing device. The power output may be determined by measuring (1) the voltage across two terminals of the power bank battery, and (2) the output current of the power bank battery. The electrical connection may include, for example, a USB cable, Lightning cable, wireless charging connection, etc. The method 800 further includes obtaining a communication signal from the mobile computing device (804). The obtained signal indicates an amount of power received at the mobile computing device battery. The indication of the amount of power may include an indication of voltage of the mobile computing device battery, an input current to the mobile computing device battery, or a product thereof that indicates the amount of power received at the mobile computing device battery.

In some embodiments, the indication of the amount of power received at the mobile computing device battery need only include either of (1) the instantaneous mobile computing device battery voltage, or (2) the instantaneous input current to the mobile computing device battery. For example, when a CC/CV charging protocol is used, it may be determined that constant-current charging is occurring, and thus, only an indication of the instantaneous mobile computing device battery voltage needs to be obtained from the mobile computing device to determine the instantaneous amount of power received at the mobile computing device battery (where a previously measured or otherwise known current value, e.g., 2.5 A, is used as the second component to calculate the instantaneous amount of power received at the mobile computing device battery). Similarly, if it is determined that constant-voltage charging is occurring, only an indication of the instantaneous input current needs to be obtained from the mobile computing device to determine the instantaneous power received at the mobile computing device battery (and a previously measured or otherwise known voltage value, e.g., the maximum voltage of the mobile computing device battery, may be used as the second component to calculate the instantaneous amount of power received at the mobile computing device battery).

The method 800 additionally includes comparing the amount of power received at the mobile computing device battery to the instantaneous power output of the power bank battery to determine a dynamic charging efficiency (806). The method 800 further includes interrupting the supply of electric charge to the mobile computing device battery when the dynamic charging efficiency is less than or equal to a threshold value (808).

The method 800 may include additional, fewer, or alternate actions, in various embodiments.

FIG. 9 depicts a block diagram corresponding to an example method 900 for determining dynamic charging efficiency via a mobile computing device (e.g., the mobile computing device 120 as illustrated in FIG. 1). At least some actions of the method 900 may correspond to actions in the flow diagram 700 of FIG. 7. Actions of the power bank in the method 900 may be performed, for example, by one or more processors of the mobile computing device and/or a communication module of the mobile computing device.

The method 900 includes obtaining a communication signal from a power bank while an internal battery of the mobile computing device is receiving electric charge from the power bank (902). The obtained signal indicates an instantaneous power output from the power bank battery. The indication of the power output may include an indication of voltage of the power bank battery, an output current of the power bank battery, or a product thereof that indicates the power output of the power bank battery. The method 900 further includes determining an amount of power received at the mobile computing device battery (904), for example by measuring voltage across two terminals of the mobile computing device battery and input current to the mobile computing device battery.

In some embodiments, the indication of the power output need only include either of (1) the instantaneous power bank battery voltage, or (2) the instantaneous output current of the power bank battery. For example, when a CC/CV charging protocol is used, it may be determined that constant-current charging is occurring, and thus, only an indication of the instantaneous power bank battery voltage needs to be obtained from the power bank to determine the instantaneous power output of the power bank battery (where a previously measured or otherwise known current value, e.g., 2.5 A, is used as the second component to calculate the instantaneous power output). Additionally, if it is determined that the power bank has reached its minimum voltage, of the instantaneous battery output current needs to be obtained from the power bank to determine the instantaneous battery power output (and a previously measured or otherwise known voltage value, e.g., the minimum voltage of the power bank, may be used as the second component to calculate the instantaneous power output of the power bank battery).

The method 900 additionally includes comparing the amount of power received at the mobile computing device battery to the instantaneous power output of the power bank battery to determine a dynamic charging efficiency (906). The method 900 further includes interrupting the supply of electric charge to the mobile computing device battery when the dynamic charging efficiency is less than or equal to a threshold value (908).

The method 900 may include additional, fewer, or alternate actions, in various embodiments. In some embodiments, a method may include one or more actions of the example method 800 in combination with one or more actions of the example method 900.

Additional Considerations

All of the foregoing mobile computing devices and power banks may include additional, less, or alternate functionality, including that discussed herein. All of the foregoing methods may include additional, less, or alternate actions, including those discussed herein, and may be implemented via one or more local or remote processors and/or transceivers, and/or via computer-executable instructions stored on computer-readable media or medium.

The processors, transceivers, mobile devices, and/or other computing devices discussed herein may communicate with each via wireless communication networks or electronic communication networks. For instance, the communication between computing devices may be wireless communication or data transmission over one or more radio links, or wireless or digital communication channels.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A portable power bank device, comprising:
a battery for supplying electric charge to a battery of a mobile computing device external to the power bank, via an electrical connection between the power bank battery and the mobile computing device battery;
a communication module for exchanging communication signals with the mobile computing device; and
a control module comprising one or more processors and a memory storing non-transitory computer executable instructions that, when executed via the one or more processors, cause the power bank to:
while the power bank is supplying electric charge to the mobile computing device battery, determine an instantaneous power output of the power bank battery,
obtain, via the communication module, a communication signal from the mobile computing device, the obtained signal being indicative of an amount of power received at the mobile computing device battery,
compare the amount of power received at the mobile computing device battery to the instantaneous power output of the power bank battery to determine a dynamic charging efficiency, and
interrupt the supply of electric charge to the mobile computing device battery when the dynamic charging efficiency is less than or equal to a threshold value.

2. The portable power bank device of claim 1, wherein the non-transitory computer executable instructions further include instructions that, when executed via the one or more processors, cause the power bank to transmit to the mobile computing device, via a communication module of the power bank, an indication of the dynamic charging efficiency.

3. The portable power bank device of claim 2, wherein the interrupting of the supply of electric charge is performed further based upon a user interaction received by the portable power bank device from the mobile computing device, the user interaction being received subsequent to transmitting of the indication of the dynamic charging efficiency to the mobile computing device.

4. The portable power bank device of claim 1, wherein the non-transitory computer executable instructions further include instructions that, when executed via the one or more processors, cause the power bank to, subsequent to interrupting the supply of electric charge, resume the supply of electric charge to the mobile computing device battery.

5. The portable power bank device of claim 1, wherein the threshold value is a value set by a user of the mobile computing device via a software application executing at the mobile computing device.

6. The portable power bank device of claim 1, wherein the determining of the instantaneous power output is based upon at least one of (i) a measurement of a dynamic voltage of the battery of the power bank, or (ii) a measurement of a dynamic outflowing current from the battery of the power bank.

7. The portable power bank device of claim 1, wherein the obtained signal indicative of the power received at the mobile computing device battery comprises one of (i) a value corresponding to voltage of a battery of the mobile computing device, and (ii) a value corresponding to amount of inflowing electric current to the battery of the mobile computing device.

8. The portable power bank device of claim 1, wherein the communication signal obtained by the power bank communication module is a wireless radio frequency communication signal.

9. The portable power bank device of claim 1, wherein the electrical connection between the power bank battery and the mobile computing device battery comprises a wired electrical connection between the power bank and the mobile computing device.

10. The portable power bank device of claim 1, wherein the electrical connection between the power bank battery and the mobile computing device battery comprises a wireless electrical connection between the power bank and the mobile computing device.

11. A mobile computing device, comprising:
an internal battery configured to act as a power supply for the mobile computing device, wherein the internal battery of the mobile computing device is configured to receive electric charge from a battery of a portable power bank device external to the mobile computing device, via an electrical connection between the power bank battery and the mobile computing device battery;
a communication module for exchanging communication signals with the power bank;
one or more processors; and
one or more computer-readable memories storing non-transitory computer executable instructions that, when executed via the one or more processors, cause the mobile computing device to:
while the mobile computing device battery is receiving electric charge from the power bank, obtain, via the communication module, a communication signal from the power bank, the obtained signal being indicative of an instantaneous power output of the power bank battery,
determine an amount of power received at the mobile computing device battery from the power bank battery,
compare, via the one or more processors, the amount of power received at the mobile computing device battery to the instantaneous power output of the power bank battery to determine a dynamic charging efficiency, and
interrupt the supply of electric charge to the mobile computing device battery when the dynamic charging efficiency is less than or equal to a threshold value.

12. The mobile computing device of claim 11, wherein the non-transitory computer executable instructions further include instructions that, when executed via the one or more processors, cause the mobile computing device to display, via a graphical user interface at the mobile computing device, an indication of the dynamic charging efficiency.

13. The mobile computing device of claim 12, wherein the non-transitory computer executable instructions further include instructions that, when executed via the one or more processors, cause the mobile computing device to receive a user interaction via the graphical user interface, and wherein the interrupting of the supply of electric charge is based further upon the receiving of the user interaction.

14. The mobile computing device of claim 11, wherein the non-transitory computer executable instructions further include instructions that, when executed via the one or more processors, cause the mobile computing device to, subsequent to interrupting the supply of electric charge, resume the supply of electric charge to the mobile computing device battery.

15. The mobile computing device of claim 11, wherein the threshold value is a value set by a user of the mobile computing device via a software application executing at the mobile computing device.

16. The mobile computing device of claim 11, wherein the determining of the power received at the mobile computing device battery is based upon at least one of (i) a measurement of a dynamic voltage of the mobile computing device battery, or (ii) a measurement of a dynamic inflowing current to the mobile computing device battery.

17. The mobile computing device of claim 11, wherein the obtained signal indicative of the instantaneous power output from the power bank to the electrical connection comprises one of (i) a value corresponding to voltage of the power bank battery, and (ii) a value corresponding to amount of outflowing electric current from the power bank battery.

18. The mobile computing device of claim 11, wherein the communication signal obtained by the mobile computing device communication module is a wireless radio frequency communication signal.

19. The portable power bank device of claim 1, wherein the electrical connection between the power bank battery and the mobile computing device battery comprises a wired electrical connection between the power bank and the mobile computing device.

20. The portable power bank device of claim 1, wherein the electrical connection between the power bank battery and the mobile computing device battery comprises a wireless electrical connection between the power bank and the mobile computing device.

* * * * *